(12) United States Patent
Kitajima et al.

(10) Patent No.: US 7,293,731 B2
(45) Date of Patent: Nov. 13, 2007

(54) RECIPROCATING MECHANISM FOR SPINNING REEL

(75) Inventors: Keigo Kitajima, Sakai (JP); Kei Saito, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/505,394

(22) Filed: Aug. 17, 2006

(65) Prior Publication Data

US 2007/0057105 A1   Mar. 15, 2007

(30) Foreign Application Priority Data

Sep. 7, 2005  (JP)  ............................. 2005-258862
Mar. 15, 2006  (JP)  ............................. 2006-071345

(51) Int. Cl.
*A01K 89/01* (2006.01)
(52) U.S. Cl. ..................................... 242/241
(58) Field of Classification Search ................ 242/241, 242/242, 278, 279
See application file for complete search history.

(56) References Cited

U.S. PATENT DOCUMENTS 5,427,324 A * 6/1995 Kawashiro ................. 242/241
5,775,612 A    7/1998 Hashimoto
5,934,586 A    8/1999 Kang et al.
6,290,157 B1   9/2001 Shibata
6,655,619 B2 * 12/2003 Kitajima ..................... 242/241

FOREIGN PATENT DOCUMENTS

GB   2 246 059 A      1/1992
JP   11-018639 A      1/1999
JP   2000-125716 A    5/2000

* cited by examiner

*Primary Examiner*—Emmanuel M Marcelo
(74) *Attorney, Agent, or Firm*—Global IP Counselors, LLP

(57) ABSTRACT

A reciprocating mechanism includes a worm shaft with a helical groove and a sliding member. The worm shaft is disposed parallel to a spool shaft. The sliding member moves back-and-forth along an axial direction of the spool shaft by rotation of the worm shaft. The sliding member includes a body member with a recess portion having an engaging member. The engaging member includes an engaging portion, a first shaft portion and a second shaft portion. The engaging portion engages with the helical groove. The first shaft portion is formed on an end portion adjacent the engaging portion to have a diameter smaller than a diameter of the engaging portion. The second shaft portion is formed on an end portion of the first shaft portion that is remote from the engaging portion 70 to have a diameter smaller than a diameter of the first shaft portion.

12 Claims, 16 Drawing Sheets

RECIPROCATING MECHANISM FOR SPINNING REEL

CROSS-REFERENCE TO RELATED APPLICATIONS

This application claims priority to Japanese Patent Application Nos. 2005-258862 and 2006-71345. The entire disclosures of Japanese Patent Application Nos. 2005-258862 and 2006-71345 are hereby incorporated herein by reference.

BACKGROUND OF THE INVENTION

1. Field of the Invention

The present invention generally relates to a reciprocating mechanism. More specifically, the present invention relates to a reciprocating mechanism of a spinning reel for reciprocating a spool mounted on a reel unit of the spinning reel movably back and forth in association with a rotation of a master gear.

2. Background Information

Conventionally, an oscillation mechanism is mounted on a spinning reel for uniformly winding a fishing line on a spool. A reduction gear oscillation mechanism having a gear cam that engages with a master gear and a traverse cam oscillation mechanism having a worm shaft that rotates in association with a pinion gear have been known in the conventional art.

The traverse cam oscillation mechanism includes a worm shaft, an interlocking mechanism and a sliding member. The worm shaft is arranged parallel to a spool shaft. The spool is secured to the spool shaft. The interlocking mechanism rotates the worm shaft. The sliding member engages with the worm shaft. See, for example, Japanese Patent Publication No. H11-18639.

The sliding member in this type of oscillation mechanism includes a body member and an engaging member that is stored in the body member. A helical groove is formed on an outer periphery of the worm shaft. A front end portion of the engaging member engages with the helical groove. A circular through hole is formed in the body member so that it penetrates the body member in a direction intersecting with the worm shaft. A base end portion of the engaging member is slidably inserted into the through hole. The base end portion of the engaging member is a columnar shaft portion with a diameter that is cut to be smaller than that of the front end portion thereof. In addition, a female threaded portion is formed on a rear end of the spool shaft. The sliding member is fastened to the spool shaft by screwing a bolt into the female threaded portion. Therefore, when the sliding member shifts back and forth along the worm shaft, the spool shaft also shifts back and forth.

When the shaft portion of the engaging member is cut into a columnar shape, a burr or a cutting scar may be generated in a corner portion of the shaft portion. Because of this, after cutting the engaging member, barreling is performed on the engaging member. During barreling, the engaging member and an abrasive compound are mixed in an abrasive tank, and rotated and shaken therein. Thus, the burr and cutting scar of the engaging member is removed as the abrasive compound strikes against the engaging member.

In the aforementioned conventional oscillation mechanism, barreling is performed on the engaging member after the cutting thereof. In this kind of barreling, an abrasive compound with large particles may be used for shortening the amount of time for abrasion. However, the diameter of the shaft portion of the engaging member is formed to be smaller than that of the front end portion thereof. Therefore, when the abrasive compound with large particles is used, the abrasive compound may not easily contact a stepped portion between the shaft portion and the front end portion. Accordingly, the shaft portion may be formed in a tapered shape and the diameter thereof may be entirely reduced from the base end portion side to the front end portion side. In this way, if the tapered shaft portion whose diameter is entirely reduced from the base end portion side to the front end portion side is formed and inserted into the through hole of the body member, a slight gap is generated between the shaft portion and the through hole throughout the through hole. Thus, when the slight gap is generated, and the shaft portion of the engaging member slides through the through hole, there is a possibility that the shaft portion wobbles in the through hole. As a result, the sliding member is prevented from smoothly reciprocating back and forth.

In view of the above, it will be apparent to those skilled in the art from this disclosure that there exists a need for an improved reciprocating mechanism of a spinning reel that prevents a sliding member from wobbling when sliding. This invention addresses this need in the art as well as other needs, which will become apparent to those skilled in the art from this disclosure.

SUMMARY OF THE INVENTION

A reciprocating mechanism of a spinning reel according to a first aspect of the present invention is a reciprocating mechanism of a spinning reel for reciprocating a spool secured to a spool shaft that is mounted on a reel unit of the spinning reel movably back and forth in association with rotation of a master gear that includes a worm shaft, a sliding member, a guide portion and a rotation transmission portion. The worm shaft is disposed along an axial direction of the spool shaft. The worm shaft has an intersecting helical groove on an outer peripheral surface thereof. The worm shaft rotates in association with the master gear. The sliding member is configured to be non-movably coupled to the spool shaft in the axial direction. The sliding member includes a body member with a recess portion. The recess portion has an engaging member and a longitudinal axis intersecting with the axial direction of the spool shaft. The sliding member reciprocates back-and-forth along the axial direction by rotation of the worm shaft. The guide portion is configured to be mounted on the reel unit to guide the sliding member back-and-forth along the axial direction. The rotation transmission portion is configured to transmit the rotation of the master gear to the worm shaft. The engaging member includes an engaging portion that engages with the helical groove and a shaft portion that supports the engaging member. The shaft portion is located along the longitudinal axis of the recess portion. The shaft portion has an end portion that is remote from the engaging portion and another end portion that is adjacent the engaging portion. The end portion and the another end portion of the shaft portion support the engaging member at the recess portion. The shaft portion has a diameter smaller than a diameter of the engaging portion.

According to this reciprocating mechanism, the engaging member comprises the engaging portion and the shaft portion with a diameter smaller than a diameter of the engaging portion. The engaging member is supported by the recess portion and the shaft portion. Here, for example, the shaft portion can be formed to comprise a first shaft portion that has a diameter smaller than that of the engaging portion, and a second shaft portion that has a diameter smaller than that of the first shaft portion. In this configuration, stepped portions are formed between the engaging portion and the first shaft portion, and between the first shaft portion and the second shaft portion, respectively. Therefore, when barreling is performed for the engaging member with an abrasive compound with large particles after cutting is performed for it, the abrasive compound does not easily contact these stepped portions. Accordingly, the first and second shaft portions may be respectively formed in a tapered shape so that a diameter thereof is decreased toward the front end portion side thereof. In this configuration, the first and second shaft portions are respectively formed in a tapered shape so that a diameter thereof is decreased toward the front end portion thereof. Therefore, a tapered portion in the entire first and second shaft portions will be decreased, compared to a conventional configuration in which a shaft portion is formed in a tapered shape so that the diameter thereof is entirely decreased toward the front end portion thereof. Because of this, a gap generated between the first and second shaft portions and the recess portion will be decreased when they are inserted into the recess portion. Accordingly, the first and second shaft portions can be prevented from wobbling in the recess portion. In this configuration, it is possible to prevent the sliding member from wobbling, and thus the back-and-forth reciprocation of the sliding member can be smoothly performed.

In another configuration, for example, the sliding member can be configured to comprise a tubular bearing whose outer peripheral portion is mounted on the recess portion and whose inner peripheral portion supports the engaging member. In addition, the bearing can be configured to include a first hole that is formed on the inner peripheral portion of the base end portion thereof located in the vicinity side of the base end portion of the engaging portion, and a second hole that is formed on the inner peripheral portion of the front end portion located in a side of the first hole remote from the base end portion of the engaging portion so as to be communicated with the first hole and is formed to have a diameter smaller than that of the first hole. In this configuration, when barreling is performed for the engaging member with an abrasive compound with large particles after cutting work is performed for it, the shaft portion is formed in a tapered shape so that the diameter thereof is entirely decreased toward the front end portion side thereof. In other words, the front end portion of the shaft portion is formed to have a diameter smaller than that of the base end portion. However, in this configuration, the second hole formed on the inner peripheral portion of the front end portion of the bearing is formed to have a diameter smaller than that of the first hole formed on the inner peripheral portion of the base end portion of the bearing. Therefore, the small-diameter front end portion of the shaft is supported by the small-diameter second hole, and the large-diameter base end portion of the shaft portion is supported by the large-diameter first hole. Therefore, a gap generated between the small-diameter front end portion of the shaft portion and the hole will be especially decreased, compared to a configuration in which only a hole with the same diameter is formed in the bearing. Because of this, a gap generated between the shaft portion and the first and second holes will be decreased when the shaft portion is inserted into the first and second holes. Accordingly, the shaft portion can be prevented from wobbling in the first and the second holes. In this configuration, it is possible to prevent the sliding member from wobbling, and thus the back-and-forth reciprocation of the sliding member can be smoothly performed.

A reciprocating mechanism in accordance with a second aspect of the present invention is the reciprocating mechanism according to the first aspect of the present invention, wherein the shaft portion includes a first shaft portion formed at the end portion that is adjacent the engaging portion and a second shaft portion formed at the end portion that is remote from the engaging portion. The first shaft portion has a diameter smaller than a diameter of the engaging portion. The second shaft portion has a diameter smaller than the diameter of the first shaft portion.

In this configuration, stepped portions are formed between the engaging portion and the first shaft portion, and between the first shaft portion and the second shaft portion, respectively. Therefore, when barreling is performed for the engaging member with an abrasive compound with large particles after cutting is performed for it, the abrasive compound does not easily contact these stepped portions. Accordingly, the first and second shaft portions may be respectively formed in a tapered shape so that diameter thereof is decreased toward the end portion remote from the engaging portion. Therefore, a tapered portion in the entire first and second shaft portions will be decreased compared to a conventional configuration in which a shaft portion is formed in a tapered shape so that the diameter thereof is entirely decreased toward the front end portion thereof. Because of this, a gap generated between the first and second shaft portions and the recess portion will be decreased when they are inserted into the recess portion. Accordingly, the first and second shaft portions can be prevented from wobbling in the recess portion. In this configuration, it is possible to prevent the sliding member from wobbling, and thus the back-and-forth reciprocation of the sliding member can be smoothly performed.

A reciprocating mechanism in accordance with a third aspect of the present invention is the reciprocating mechanism according to the second aspect of the present invention, wherein the sliding member further comprises a second bearing whose outer peripheral portion is mounted to the recess portion, and whose inner peripheral portion supports the second shaft portion. In this configuration, the second shaft portion can be reliably prevented from wobbling in the recess portion because the second bearing is provided with the second shaft portion whose diameter is smaller than that of the first bearing.

A reciprocating mechanism in accordance with a fourth aspect of the present invention is the reciprocating mechanism according to the third aspect of the present invention, wherein the sliding member further comprises a second bearing whose outer peripheral portion is mounted on the recess portion and whose inner peripheral portion supports the second shaft portion. In this configuration, the first and second shaft portions can be further reliably prevented from wobbling in the recess portion, because the first and second bearings comprised of a roller bearing and a sliding bearing whose outside diameter are the same as each other are provided with the reciprocating mechanism, for instance.

A reciprocating mechanism in accordance with a fifth aspect of the present invention is the reciprocating mechanism according to one of the third and fourth aspects of the present invention, wherein the sliding member further comprises a tubular member mounted between the second shaft portion and the second bearing. In this configuration, if the first and second bearings that are comprised of roller bearings having the same inside and outside diameters are provided, the first and second shaft portions can be reliably prevented from wobbling in the recess portion by disposing a tubular member comprised of a sliding bearing in a gap generated between the second shaft portion and the second bearing.

A reciprocating mechanism in accordance with a sixth aspect of the present invention is the reciprocating mechanism according to the fifth aspect of the present invention, wherein the tubular member includes a tubular portion that is mounted between the second shaft portion and the second bearing, and a brim portion that is integrally formed with the tubular portion to have a diameter larger than a diameter of the tubular portion and mounted to a surface of the second bearing that faces the engaging portion. In this configuration, retention of the tubular member can be easily performed by contacting the brim portion to the surface of the second bearing.

A reciprocating mechanism in accordance with a seventh aspect of the present invention is the reciprocating mechanism according to the sixth aspect of the present invention, wherein the brim portion is mounted on a surface of the first bearing that faces away from the engaging portion. In this configuration, the surface of the second bearing is reliably prevented from contacting the surface of the first bearing, because the brim portion further contacts the surface of the first bearing in addition to the surface of the second bearing.

A reciprocating mechanism in accordance with an eighth aspect of the present invention is the reciprocating mechanism according to one of the first through seventh aspects of the present invention, wherein the sliding member further includes a plate member secured to the body member to occlude an aperture of the recess portion that is remote from the engaging portion. In this configuration, retention of the engaging member can be performed by the plate member.

A reciprocating mechanism in accordance with a ninth aspect of the present invention is the reciprocating mechanism according to the eighth aspect of the present invention, wherein the plate member is secured on the body member by a screw member. When at least a portion of the body member moves to a position where the body member overlaps with the master gear in the direction of the spool shaft, a head of the screw member is disposed in a position where it does not contact the master gear. In this configuration, it is possible to compactly dispose the master gear, the body member, the plate member, and the screw member for securing the plate member.

A reciprocating mechanism according to a tenth aspect of the present invention is the reciprocating mechanism according to one of the first through ninth aspects of the present invention, wherein the guide portion is disposed along the axial direction of the spool shaft, and includes a first guide shaft and a second guide shaft that guide the sliding member in the axial direction. In this configuration, the sliding member is reliably guided by the first guide shaft and the second guide shaft.

A reciprocating mechanism according to an eleventh aspect of the present invention is the reciprocating mechanism according to the first aspect, wherein the sliding member includes a bushing with an outer peripheral portion that is mounted at the recess portion and an inner peripheral portion that supports the engaging member, a first hole formed at an end portion of the inner peripheral portion of the bushing that is adjacent the engaging portion, and a second hole is in communication with the first hole and is formed at another end portion of the inner peripheral portion of the bushing that is remote from the engaging portion, and the second hole has a diameter smaller than a diameter of the first hole.

In this reciprocating mechanism, the sliding member comprises a tubular bearing whose outer peripheral portion is mounted on the recess portion and whose inner peripheral portion supports the engaging member. The bearing comprises a first hole that is formed on the inner peripheral portion of the base end portion, and a second hole that is formed on the inner peripheral portion of the front end portion to be communicated with the first hole and is formed to have a diameter smaller than that of the first hole. In this configuration, when barreling is performed for the engaging member with an abrasive compound with large particles after cutting is performed for it, the shaft portion is formed in a tapered shape so that the diameter thereof is entirely decreased toward the front end portion side thereof. In other words, the diameter of the front end portion of the shaft portion is formed to be smaller than that of the base end portion thereof. However, in this case, the second hole formed on the inner peripheral portion of the front end portion of the bearing is formed to have a diameter smaller than that of the first hole formed on the inner peripheral portion of the base end portion of the bearing. Therefore, the small-diameter front end portion of the shaft is supported by the small-diameter second hole, and large-diameter base end portion of the shaft portion is supported by the large-diameter first hole. Therefore, a gap generated between the small-diameter front end portion of the shaft portion and the hole will be especially decreased, compared to a configuration in which only a hole with the same diameter is formed in the bearing. Because of this, a gap generated between the shaft portion and the first and second holes will be decreased when the shaft portion is inserted into the first and second holes. Accordingly, the shaft portion can be prevented from wobbling in the first and the second holes. In this configuration, it is possible to prevent the sliding member from wobbling, and thus the back-and-forth reciprocation of the sliding member can be smoothly performed.

A reciprocating mechanism in accordance with a twelfth aspect of the present invention is the reciprocating mechanism according to the eleventh aspect of the present invention, wherein the bearing comprises a first bearing, on the inner peripheral portion of which the first hole is formed, and a second bearing portion formed separately from the first bearing portion, on the inner peripheral portion of which the second hole is formed. In this configuration, the small-diameter first hole and the large-diameter second hole can be easily formed because the first and second bearings are configured to be separated from each other. In addition, in this configuration, a portion of the front end portion side of the second hole of the second bearing portion can be formed to have a large diameter. Therefore, it is possible to reduce frictional resistance by making a portion of the inner diameter a relief portion.

A reciprocating mechanism in accordance with a thirteenth aspect of the present invention is the reciprocating mechanism according to an eleventh aspect of the present invention, wherein the recess portion includes a first recess portion that is formed on the inner peripheral portion adjacent the engaging portion, and a second recess portion that is formed on the inner peripheral portion remote from the engaging portion so as to be communicated with the first recess portion and is formed to have a diameter larger than that of the first recess portion. The bearings comprises a third bearing portion that is mounted on the inner peripheral portion of the first recess portion, and a fourth bearing portion that is mounted on the inner peripheral portion of the second recess portion. In this configuration, the large-diameter fourth bearing portion is engaged with the second recess portion. Therefore, the engaging member can be prevented from wobbling in the axial direction.

According to the present invention, in a reciprocating mechanism of a spinning reel, an engaging member comprises an engaging portion and a shaft portion with an end portion having a diameter smaller than another end portion thereof. The engaging member is supported by a recess portion and the shaft portion. Therefore, the shaft portion can be prevented from wobbling in the recess portion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
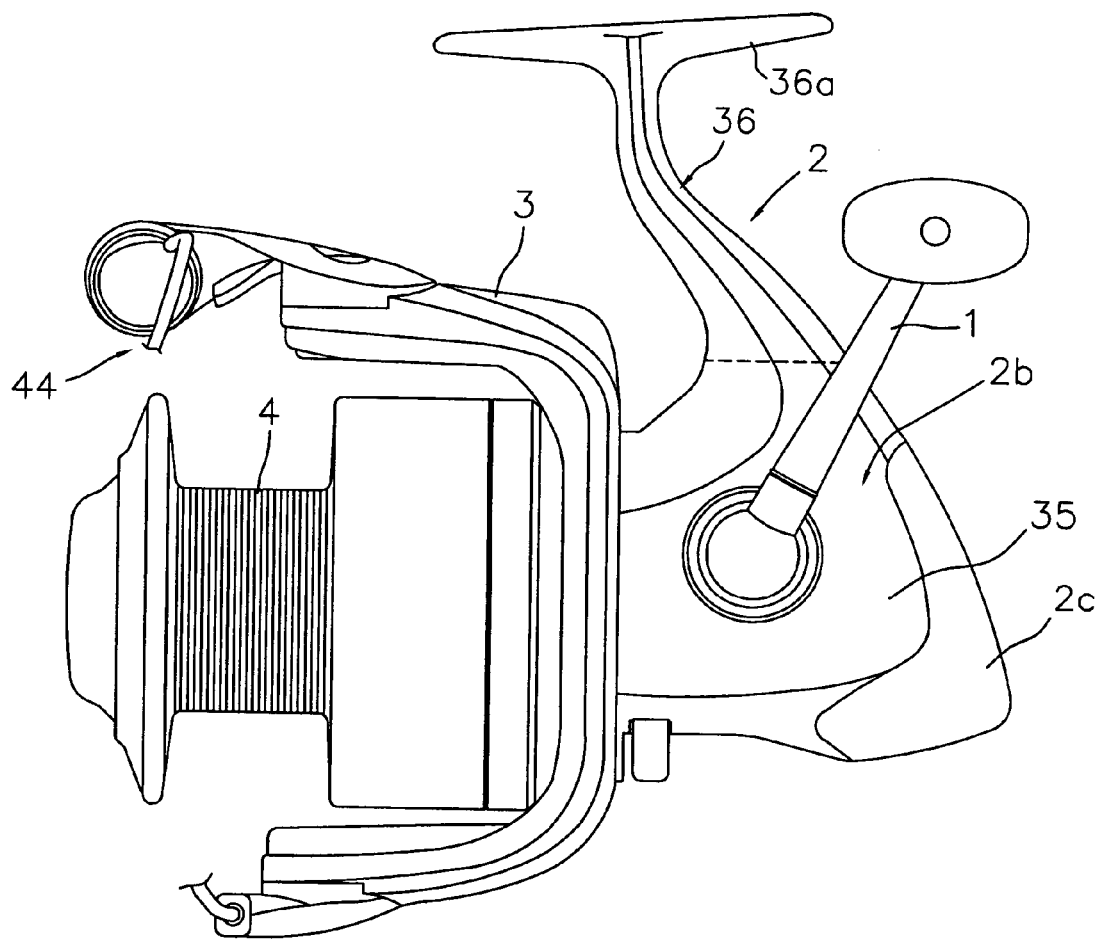
FIG. 1 is a lateral view of a spinning reel having a reciprocating mechanism according to a first embodiment of the present invention.
Figure 2:
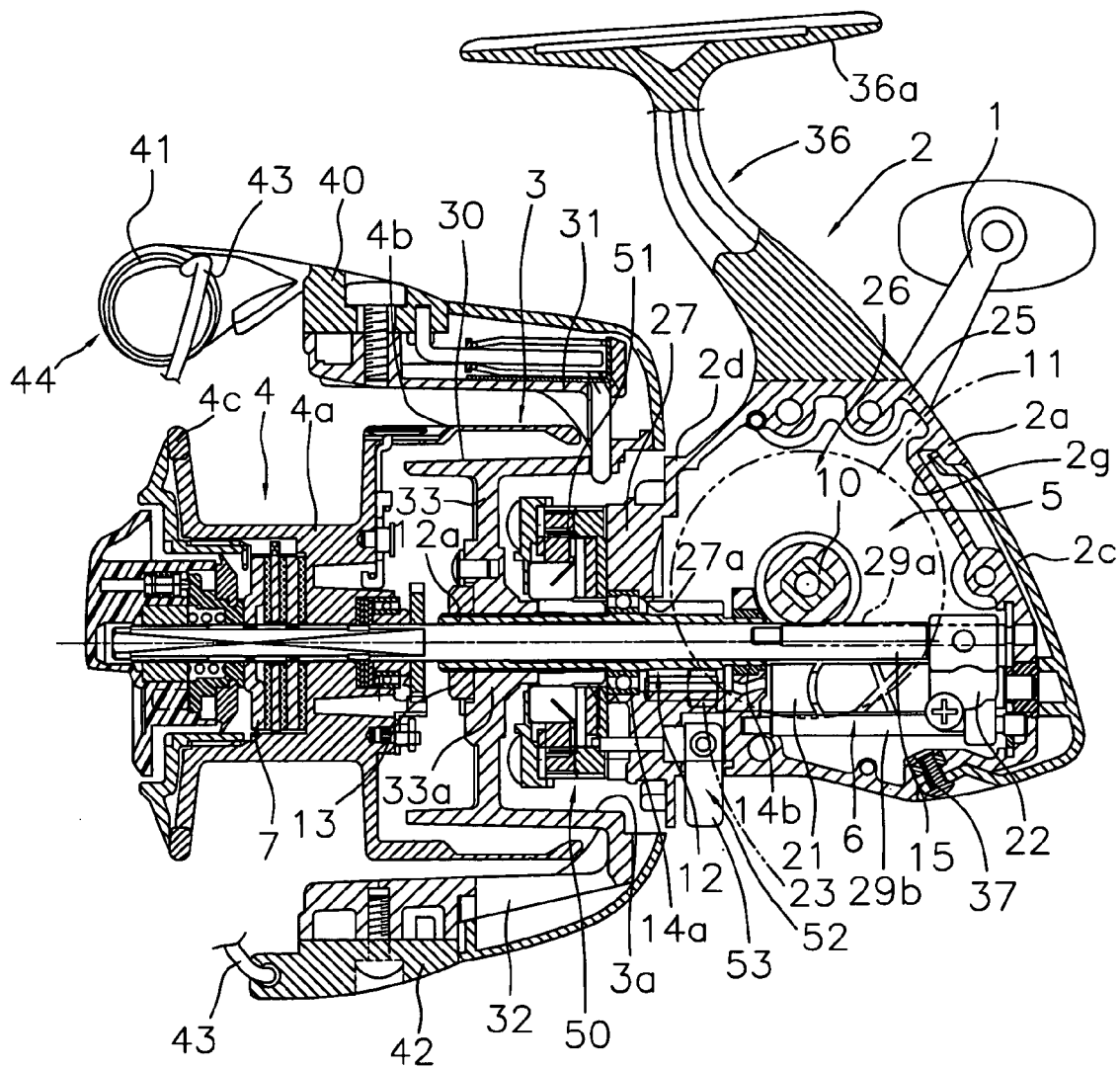
FIG. 2 is a lateral cross-sectional view of the spinning reel having the reciprocating mechanism of FIG. 1 according to the first embodiment of the present invention.
Figure 3:
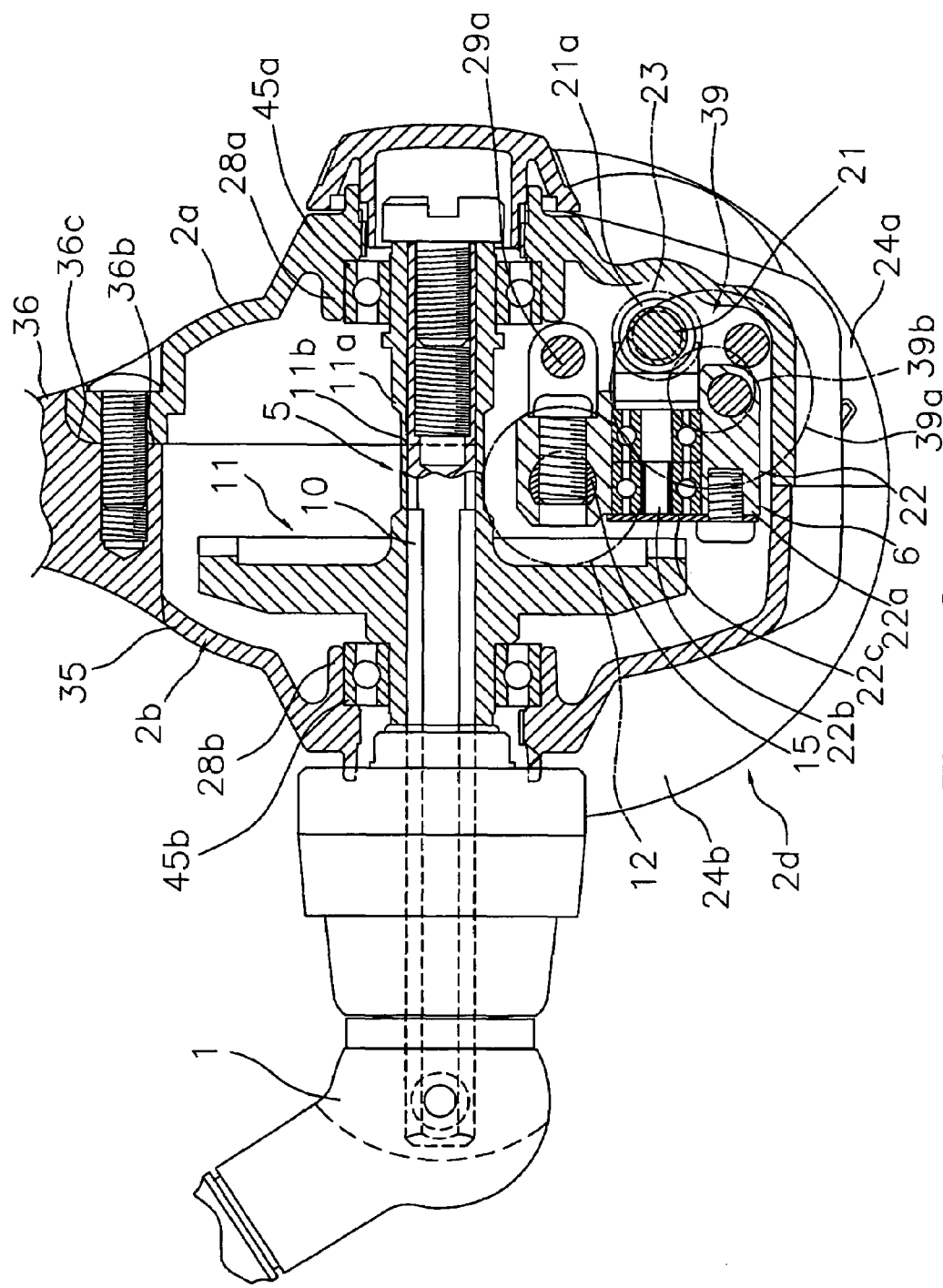
FIG. 3 is a magnified rear partial cross-sectional view of the spinning reel with the reciprocating mechanism according to the first embodiment of the present invention.

Referring initially to FIGS. 1 and 2, a spinning reel in accordance with a first embodiment of the present invention comprises a reel unit 2, a rotor 3, a spool 4, a rotation transmission mechanism 5, a reciprocating mechanism 6, a drag mechanism 7 and a spool shaft 15. The reel unit 2 is mounted on a fishing rod and rotatably supports a handle 1. The rotor 3 is mounted on a front portion of the reel unit 2 and rotates around the spool shaft 15. The spool 4 is guided by the rotor 3. Fishing line is wound onto an outer peripheral surface of the spool 4. The spool 4 is disposed on a front of the rotor 3 so that the spool 4 can move back and forth. The spool shaft 15 is mounted on the reel unit 2 so that the spool shaft 15 can move in a an axial direction of the spool shaft. The spool 4 is mounted on the front end of the spool shaft 15 through the drag mechanism 7. The rotation transmission mechanism 5 transmits the rotation of the handle 1 to the rotor 3. The reciprocating mechanism 6 is a mechanism for reciprocating the spool shaft 15 back and forth according to the rotation of the rotation transmission mechanism 5. The reciprocating mechanism 6 is also for uniformly winding the fishing line on the spool 4. The handle 1 can be mounted to a left side of the reel unit 2 as shown in FIGS. 1 and 3 or to a right side of the reel unit 2 as shown in FIG. 2.

As shown in FIGS. 1-4, the reel unit 2 includes a reel body 2a, a lid member 2b, a cover member 2c and a circular flange 2d. The reel body 2a supports the rotor 3 and the spool 4. The lid member 2b is detachably/reattachably screwed into the reel body 2a. The cover member 2c covers a rear end portion of the reel body 2a and a rear end portion of the lid member 2b. The flange 2d is formed on a front portion of the reel body 2a and the lid member 2b. The flange 2d includes a semi-circular first flange portion 24a and a semi-circular second flange portion 24b, which are formed integrally with the reel body 2a and the lid member 2b, respectively.

Figure 4:
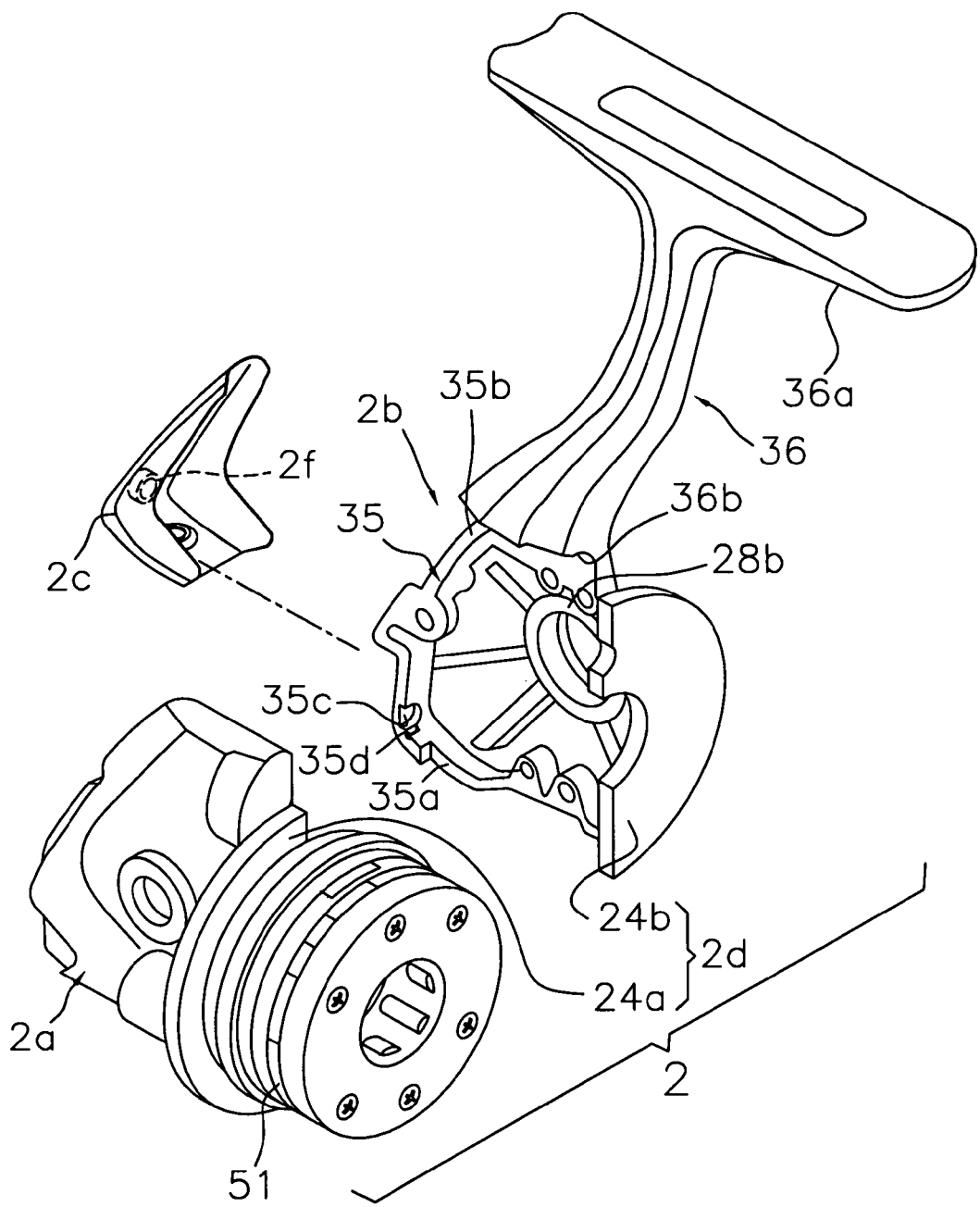
FIG. 4 is an exploded perspective view of a reel unit of the spinning reel of FIG. 1 according to the first embodiment of the present invention.

The reel body 2a is made of a glass fiber reinforced polyamide-based synthetic resin, for instance, and is manufactured by an injection molding method. As shown in FIGS. 2-4, the reel body 2a includes an aperture 25, a mechanism accommodation space 26, a front support wall portion 27 and a first handle support portion 28a. The aperture 25 is formed in a side portion of the reel body 2a. The mechanism accommodation space 26 is formed inside of the reel body 2a. The front support wall portion 27 is formed to be disposed inside a circular hollow portion 3a. The first handle support portion 28a has a boss portion for supporting one end of a handle shaft 10, which is a rotation shaft of the handle 1. A thickness of an upper portion of the reel body 2a (i.e., a portion on which the fishing rod is mounted) is formed to be thinner than approximately half the thickness of the reel unit 2. The reel unit further includes a bottom portion 2e that projects toward a lid member side compared to the upper portion of the reel body 2a. A thickness of the bottom portion 2e is formed to be approximately half the thickness of the reel unit 2.

As shown in FIG. 2, the rotation transmission mechanism 5 and the reciprocating mechanism 6 are accommodated in the mechanism accommodation space 26. The front support wall portion 27 is integrally formed with the approximately semi-circular first flange portion 24a. The first flange portion 24a is integrally formed on a front portion of the mechanism accommodation space 26. The front support wall portion 27 is formed in an approximately columnar shape so that it projects forward from the first flange portion 24a. In addition, the front support wall portion 27 has a through hole 27a that is formed in a center of the front support wall portion 27.

The lid member 2b is made of a glass fiber reinforced polyamide-based synthetic resin, for instance, and is manufactured with an injection molding method. It will be apparent to one of skill in the art from this disclosure that the reel body 2a and the lid member 2b can be made of a metal such as an aluminum alloy and a magnesium alloy. As shown in FIGS. 3 and 4, the lid member 2b includes a thin-walled cover portion 35 and an attachment leg portion 36. The cover portion 35 is integrally formed with the second flange portion 24b. The cover portion 34 functions as a wall portion at a rotor mounting side so that the cover portion 35 covers the aperture 25 of the reel body 2a and a space is formed inside the cover portion 35. The attachment leg portion 36 extends upward from the cover portion 35. A thickness of an upper portion of the cover portion 35 is formed to be thicker than approximately half the thickness of the reel unit 2. A thickness of a lower portion 35a of the cover portion 35 is formed to be approximately half the thickness of the reel unit 2 according to the projection of the reel body 2a. In the upper portion and the rear portion of the cover portion 35 except the front portion, a trimmed portion 35b is formed to be opposed to the aperture 25. A step is formed on the trimmed portion 35b so that it is in close contact with the aperture 25. The approximately semi-circular second flange portion 24b of the flange 2d is formed on a front of the cover portion 35. An inner side portion of the second flange portion 24b that protrudes inwardly serves as a wall portion for reinforcing the cover portion 35. In addition, a second handle support portion 28b that includes a boss portion for supporting the other end of the handle shaft 10 is formed on one side of the cover portion 35.

An attachment leg portion 36 is a solid, thick-walled member, one end of which extends both forward and backward and forms a fishing rod attachment portion 36a. A boundary portion between the cover portion 35 and the rod attachment leg portion 36 is cut out at less than approximately half the thickness thereof, and the upper portion of the reel body 2a is fit into the cutout portion 36b so that the outer side surfaces of the attachment leg portion 36, the cover portion 35, and the reel body 2a are smoothly connected to each other. The lid member 2b and the attachment leg portion 36 are integrally formed. It will be apparent to one of skill in the art from this disclosure that the reel body 2a and the attachment leg portion 36 may be configured to be integrally formed.

The flange 2d is formed in a disk-like shape and arranged in approximately the same plane as the edge face of the circular hollow portion 3a formed in the rear of the rotor 3 such that it covers the hollow portion 3a. The first and second flange portions 24a and 24b form a circle together. Thus, the reel body 2a and the cover portion 35 are maintained to have a high specific strength. In addition, the reel body 2a and the cover portion 35 are prevented from deforming during molding and accordingly, are maintained to have high precision.

The cover member 2c is, for example, comprised of a plated synthetic resin such as plated ABS resin and a stainless steel alloy so that it cannot be easily damaged. The cover member 2c serves to protect a portion of the reel unit 2 that is most susceptible to damage. A lower end portion of the cover member 2c is fastened to the reel body 2a by a screw 37 and an upper end portion thereof is resiliently interlocked with the reel body 2a. Specifically, as shown in FIG. 2, the cover member 2c is interlocked with an interlocking recess portion 2g formed in an inner side of a back of the reel body 2a. A cylindrical projection portion 2f projects forward from an inner surface of the cover member 2c.

As shown in FIGS. 2 and 3, the rotation transmission mechanism 5 includes a master gear 11 and a pinion gear 12. The master gear 11 has a face gear that rotates with the handle shaft 10 on which the handle 1 is secured. The pinion gear 12 meshes with the master gear 11. The master gear 11 has a master gear shaft 11a. The master gear 11 is integrally formed with the master gear shaft 11a. The handle shaft 10 is non-rotatably mounted on the master gear shaft 11a. As shown in FIG. 3, the master gear shaft 11a is supported by the reel body 2a and the lid member 2b so as to rotate around a right-and-left shaft that intersects with an anteroposterior shaft through bearings 45a and 45b. The bearings 45a and 45b are mounted inside the first and second handle support portions 28a and 28b, respectively. Furthermore, as shown in FIG. 3, the master gear shaft 11a has an intermediate portion 11b. A diameter of the intermediate portion 11b is smaller than a diameter of the other portions of the master gear shaft 11a.

The pinion gear 12 is formed in a tubular shape and serves as a rotation shaft of the rotor 3. The pinion gear 12 has a front portion 12a that penetrates a center of the rotor 3. The through hole 27a of the front support wall portion 27 rotatably supports the pinion gear 12. The front portion 12a is secured to the rotor 3 by a nut 13. A middle portion of the pinion gear 12 is rotatably supported in the reel unit 2 by a bearing 14a, which is mounted on the front support wall portion 27. A rear end portion of the pinion gear 12 is rotatably supported in the reel unit 2 by a bearing 14b, which is mounted on the reel body 2a. The spool shaft 15 penetrates an inner peripheral side of the pinion gear 12.

Figure 5:
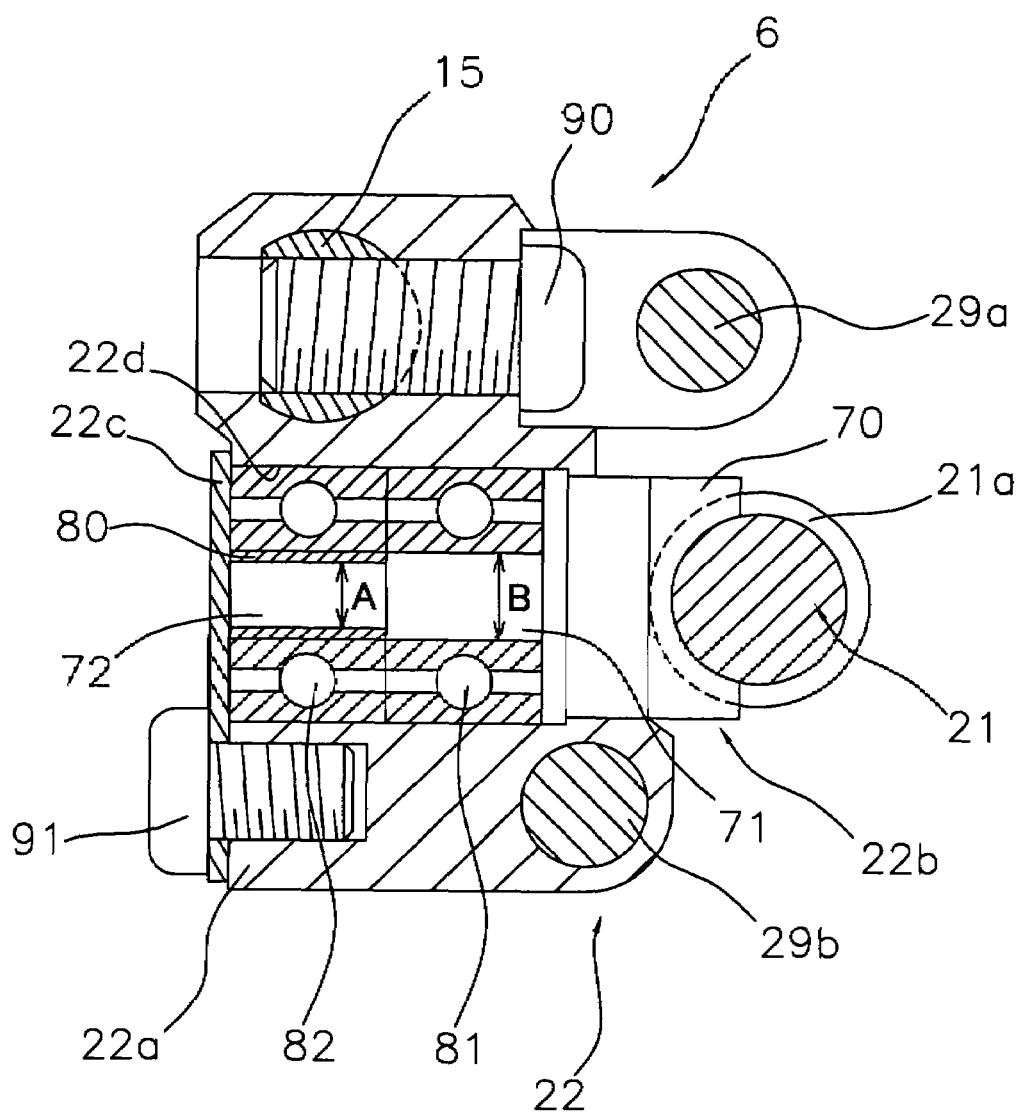
FIG. 5 is a magnified rear cross-sectional view of a portion of the spinning reel on which the reciprocating mechanism is mounted in accordance with the first embodiment of the present invention.

Referring to FIGS. 2, 3 and 5, the reciprocating mechanism 6 serves to move the spool 4 in the axial direction by moving the spool shaft 15, which is coupled to the center of the spool 4 through the drag mechanism 7, in association with the rotation of the rotation transmission mechanism 5. The reciprocating mechanism 6 is a traverse cam mechanism that includes a worm shaft 21, a sliding member 22 and an intermediate gear 23. The worm shaft 21 is disposed substantially parallel to the spool shaft 15. The sliding member 22 reciprocates back and forth along the axial direction by rotation of the worm shaft 21. The intermediate gear 23 is secured to a front end of the worm shaft 21. In addition, the reciprocating mechanism 6 further includes a first guide shaft 29a and a second guide shaft 29b that guide the sliding member 22 back and forth along the axial direction of the spool shaft 15. The first guide shaft 29a is disposed above the worm shaft 21 and the second guide shaft 29b is disposed below the spool shaft 15.

As shown in FIGS. 2 and 3, the worm shaft 21 is disposed obliquely downward at a rear side of the spool shaft 15. The worm shaft 21 has a crossed helical groove 21a that is formed on a surface of the worm shaft 21.

As shown in FIG. 5, the sliding member 22 includes a body member 22a, an engaging member 22b and a plate member 22c. A rear end portion of the spool shaft 15 is coupled to the body member 22a so that the spool shaft 15 cannot move back and forth. The body member 22a includes a recess portion 22d that penetrates the body member 22a in a direction intersecting with the direction of the spool shaft 15. Specifically, the recess portion 22d has the engaging member 22b and a longitudinal axis intersecting with the axial direction of the spool shaft 15. The plate member 22c is secured to the body member 22a to occlude an aperture of the recess portion 22d that is remote from the engaging member 22b (i.e., left side in FIG. 5).

As shown in FIG. 5, the recess portion 22d penetrates an approximately center portion of the body member 22a along a direction (i.e., the right-and-left direction in FIG. 5) intersecting with a direction of the spool shaft 15 (i.e., the direction perpendicular to a plane of FIG. 5). The rear end portion of the spool shaft 15 is secured to the upper portion of the body member 22a by a screw member 90 screwed into the body member 22a from the opposing side to the reel body 2a (i.e., the right side in FIG. 5). The plate member 22c is secured to the lower portion of the body member 22a by a screw member 91. The screw member 91 is screwed into the body member 22a from the opposing side to the lid member 2b (i.e., the left side in FIG. 5). Here, the body member 22a, the plate member 22c and the screw member 91 are disposed so as not to interfere with the master gear 11. Furthermore, the diameter of the intermediate portion 11b is small so that an upper portion of the sliding member 22 does not contact the master gear shaft 11a. In particular, when at least a portion of the body member 22a moves to a front end side position that overlaps with the master gear 11 in the direction of the spool shaft 15, a head of the screw member 91 is disposed radially outward from the teeth of the master gear 11 (i.e., downside in FIG. 5) so as not to contact the master gear 11.

As shown in FIG. 5, the engaging member 22b includes an engaging portion 70, a first shaft portion 71 and a second shaft portion 72. The engaging portion 70 engages with the helical groove 21a. The first shaft portion 71 is formed on an end portion adjacent the engaging portion 70, and the diameter thereof is formed to be smaller than the engaging portion 70. The second shaft portion 72 is formed on an end portion of the first shaft portion 71. The first and second shaft portions 71 and 72 are located along the longitudinal axis of the recess portion. A diameter of the second shaft portion 72 is formed to be smaller than a diameter of the first shaft portion 71. An outside diameter of the engaging portion 70 is formed to be approximately the same as the inside diameter of the recess portion 22d. The engaging portion 70 has a circular arc recess shape so as to engage with the helical groove 21a. The engaging portion 70, the first shaft portion 71 and the second shaft portion 72 are formed to be integrated with each other, for example, by cutting. An outside diameter B of the first shaft portion 71 is formed to be smaller than the diameter of the engaging portion 70. An outside diameter A of the second shaft portion 72 is formed to be smaller than the outside diameter B of the first shaft portion 71.

The outside diameter A of the second shaft portion 72 is formed to be about 1.5 mm, for example, and the outside diameter B of the first shaft portion 71 is formed to be about 2.0 mm, for example. In this configuration, the outside diameter A of the second shaft portion 72 is formed to be relatively large so that it falls within the range between about 0.8 mm and 1.8 mm, for example. Therefore, deformation and damage of the second shaft portion 72 caused by the barreling is prevented. It will be apparent to one of skill in the art from this disclosure that the outside diameters A and B are not limited to this configuration as long as the outside diameter A of the second shaft portion 72 is formed to be smaller than the outside diameter B of the first shaft portion 71.

As shown in FIG. 5, the sliding member 22 further includes a tubular member 80, a first bearing 81 and a second bearing 82. The first bearing 81 has an outer race that is mounted on the recess portion 22d and an inner race that supports the first shaft portion 81. The second bearing 82 has an outer race that is mounted on the recess portion 22d and an inner race that supports the second shaft portion 72. The tubular member 80 is mounted between the second shaft portion 72 and the second bearing 82.

As shown in FIG. 5, the first and second bearings 81 and 82 are roller bearings. The first and second bearing 81 and 82 have outside and inside diameters that are identical to each other. The first bearing 81 is arranged on an outer periphery of the first shaft portion 71. The second bearing 82 is arranged on an outer periphery of the tubular member 80. The tubular member 80 is mounted on an outer periphery of the second shaft portion 72. The outside diameters of the first and second bearings 81 and 82 are formed to be approximately the same as the inside diameter of the recess portion 22d. The tubular member 80 is a synthetic resin sliding bearing or bushing with an outside diameter that is approximately the same as a diameter of the first shaft portion 71. The tubular member 80 is press-fitted to the outer periphery of the second shaft portion 72 from the side of the recess portion 22d that is remote from the engaging portion 70 (i.e., the left side in FIG. 5).

In order to assemble this type of sliding member 22, the engaging member 22b is mounted on the recess portion 22d of the body member 22a from the side of the recess portion 22d that is remote from the engaging portion 70 when assembled (i.e., the left side in FIG. 5). Next, the tubular member 80 is mounted on the outer periphery of the second shaft portion 72. Then, the first bearing 81 is mounted on the outer periphery of the first shaft portion 71 and the second bearing 82 is mounted on the outer periphery of the tubular member 80. Finally, the plate member 22c is attached to the body member 22a so as to occlude the aperture of the recess portion 22d (i.e., the left side in FIG. 5). The plate member 22c is secured to the body member 22a by the screw member 91.

The intermediate gear 23 rotates in association with the rotation transmission mechanism 5. Specifically, as shown in FIG. 3, a reduction gear 39 is disposed between the intermediate gear 23 and the pinion gear 12 of the rotation transmission mechanism 5. The reduction gear 39 includes a large-diameter gear 39a and a small-diameter gear 39b. The large-diameter gear 39a meshes with the pinion gear 12. The small-diameter gear 39b is concentrically disposed with the large-diameter gear 39a. The small-diameter gear 39b meshes with the intermediate gear 23. Thus the rotation of the pinion gear 12 is transmitted to the worm shaft 21. Accordingly, the reciprocating speed of the reciprocating mechanism 6 is slowed down and the especially slow reciprocating for winding the fishing line densely onto the spool 4 is realized. The reduction gear 39 is disposed between the pinion gear 12 and the intermediate gear 23 in the reciprocating mechanism 6. However, the intermediate gear 23 may be configured to directly mesh with the pinion gear 12 without disposing the reduction gear 39 between them. In addition, the configuration of the reciprocating mechanism 6 is not limited to the aforementioned configuration as long as it is a traverse cam reciprocating mechanism in which the sliding member 22 engages with the worm shaft 21.

As shown in FIG. 2, the rotor 3 includes a cylindrical portion 30, first and second rotor arms 31 and 32 and a front wall 33. The first and second rotor arms 31 and 32 are arranged opposite to each other on sides of the cylindrical portion 30. The cylindrical portion 30, the first rotor arm 31 and the second rotor arm 32 are integrally formed.

The front wall 33 is formed on a front of the cylindrical portion 30. The front wall 33 has a boss 33a that is formed in a central portion of the front wall 33. The front portion 12a of the pinion gear 12 and the spool shaft 15 pass through a through hole formed in the boss 33a. The nut 13 is disposed on a front side of the front wall 33. The nut 13 is threaded onto a threaded portion formed on the front portion 12a of the pinion gear 12. A portion of the cylindrical portion 30 rearward from the front wall 33 forms the hollow portion 3a. The flange 2d is integrally formed with the reel body 2a and the lid member 2b. The flange 2d is flush with the rear end face of the hollow portion 3a.

A first bail support member 40 is pivotably mounted onto an outer peripheral side of the front end of the first rotor arm 31. A line roller 41 for guiding the fishing line onto the spool 4 is mounted to the front end of the first bail support member 40. In addition, a second bail support member 42 is pivotably mounted on the outer peripheral side of the front end of the second rotor arm 32. A bail 43 is provided between the line roller 41 disposed at the front end of the first bail support member 40 and the second bail support member 42. The first bail support member 40, the second bail support member 42, the line roller 41, and the bail 43 together constitute a bail arm 44.

As shown in FIG. 2, the rotor 3 has an anti-reverse rotation mechanism 50 that is disposed in an interior of the cylindrical portion 30 of the rotor 3. The anti-reverse rotation mechanism 50 includes a roller-type one-way clutch 51 and a control mechanism 52. The control mechanism 52 is for switching the one-way clutch 51 between an operating state and a non-operating state. An outer race of the one-way clutch 51 is secured to the front support wall portion 27. An inner race of the one-way clutch 51 is non-rotatably interlocked with the pinion gear 12. The control mechanism 52 includes an operation lever 53 that is disposed on a lower end of the front portion of the reel unit 2 between the reel body 2a and the lid member 2b. When the operation lever 53 is pivoted, the one-way clutch 51 is switched between an operating state and a non-operating state. When the one-way clutch 51 is in the operating state, the rotor 3 cannot rotate in the reverse direction. On the other hand, when the one-way clutch 51 is in the non-operating state, the rotor 3 can rotate in the reverse direction.

Referring to FIGS. 1 and 2, the spool 4 is made of an aluminum alloy and disposed between the first and second rotor arms 31 and 32. The spool 4 is mounted to a front end of the spool shaft 15 through the drag mechanism 7. The spool 4 includes a bobbin trunk 4a, a large diameter cylindrical skirt portion 4b and a front flange portion 4c. The fishing line is wound around an outer periphery of the bobbin trunk 4a. The large diameter cylindrical skirt portion 4b is integrally formed on a rear end of the bobbin trunk 4a. The front flange portion 4c is disposed on a front end portion of the bobbin trunk 4a.

Next, the handling and operation of the reel will be described in detail.

When casting, the bail arm 44 is flipped over to the line-releasing posture. As a result, the first bail support member 40 and the second bail support member 42 pivot. In this state, the fishing rod is cast while the fishing line is hooked with the index finger of the hand by which the fishing rod is held. Accordingly, the fishing line is released with high momentum due to the weight of the tackle. When the handle 1 is rotated in the line-winding direction in this state, the rotor 3 rotates in the line-winding direction due to the rotation transmission mechanism 5 and the spool 4 reciprocates back and forth by the reciprocating mechanism 6. Accordingly, the bail tripping mechanism (not shown) restores the bail arm 44 to the line-winding position and the fishing line is wound onto the spool 4.

Because the outside diameter A of the second shaft portion 72 is smaller than the outside diameter B of the first shaft portion 71, thereby forming a step, even if barreling is performed for the first and second shaft portions 71 and 72 using an abrasive compound with large particles, a tapered portion in the first and second shaft portions 71 and 72 will be decreased, compared to a configuration in which barreling is performed for a shaft portion without a step using an abrasive compound with large particles. Therefore, a gap generated between the first and second shaft portions 71 and 72 and the recess portion 22d will be decreased. Accordingly the first and second shaft portions 71 and 72 are prevented from wobbling in the recess portion 22d. In this configuration, it is possible to prevent the sliding member 22 from wobbling. Thus the back-and-forth reciprocation of the sliding member 22 is smoothly performed.

Second Embodiment

Figure 6:
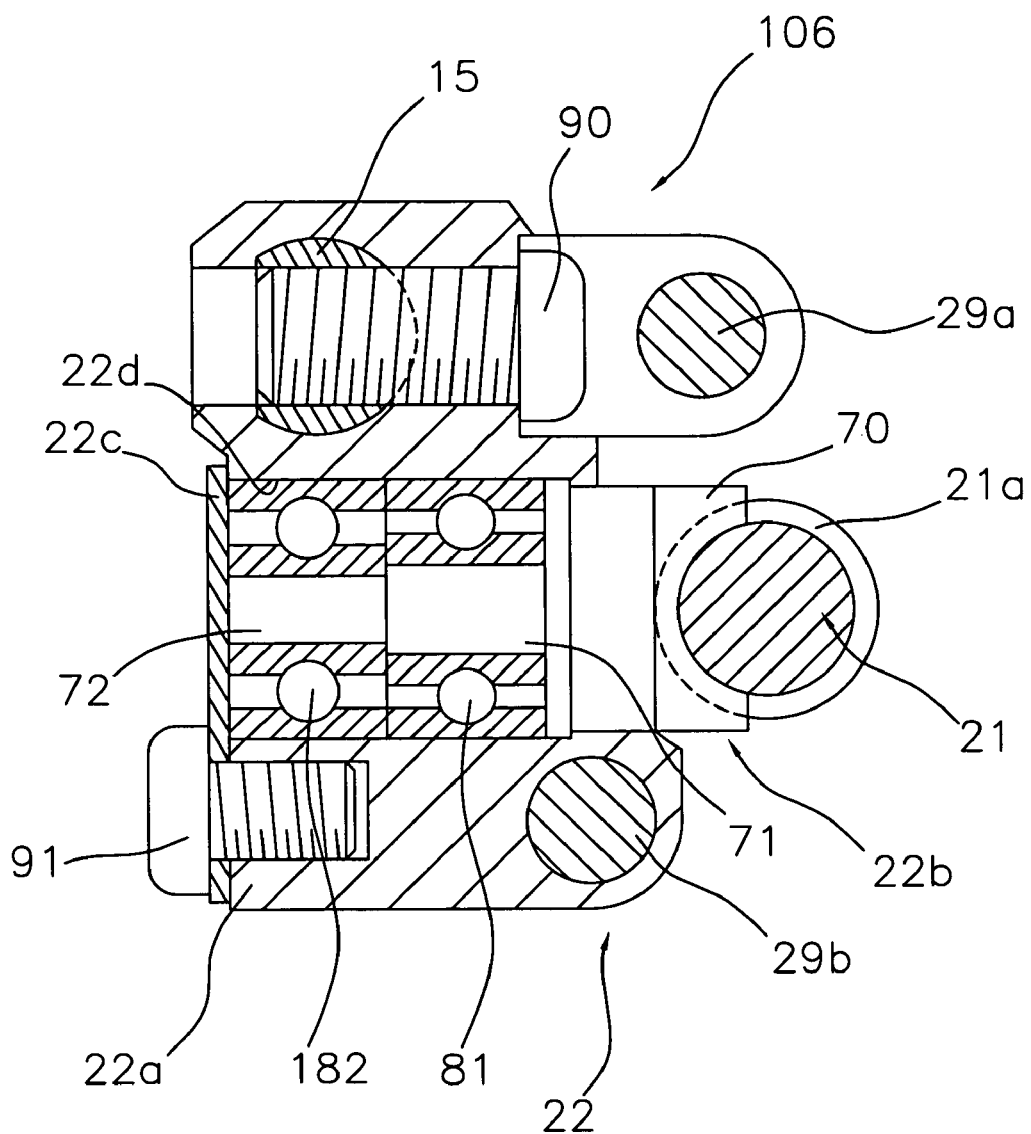
FIG. 6 is a magnified rear cross-sectional view of a portion of the spinning reel on which a reciprocating mechanism is mounted in accordance with a second embodiment of the present invention.

Referring now to FIG. 6, a reciprocating mechanism 106 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the tubular member 80 is mounted between the second shaft portion 72 and the second bearing 82. However, as shown in FIG. 6, no tubular member 80 is provided between the second shaft portion 72 and a second bearing 182 in the second embodiment. In this configuration, an outside diameter of the second bearing 182 is the same as an outside diameter of the first bearing 81, but an inside diameter of the second bearing 182 is smaller than an inside diameter of the first bearing 81. The second bearing 182 is comprised of a roller bearing.

Third Embodiment

Figure 7:
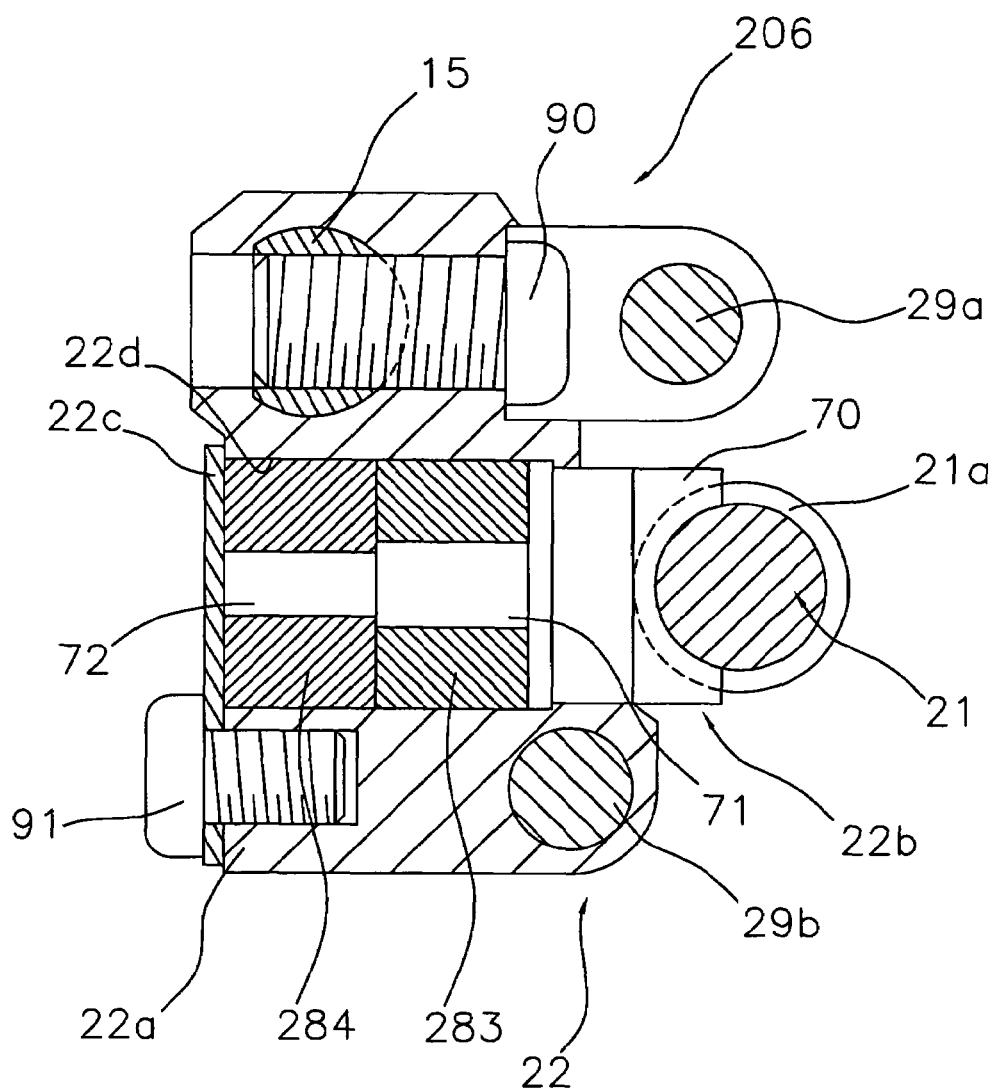
FIG. 7 is a magnified rear cross-sectional view of a portion of the spinning reel on which a reciprocating mechanism is mounted in accordance with a third embodiment of the present invention.

Referring now to FIG. 7, a reciprocating mechanism 206 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the first embodiment, the first and second bearings 81 and 82 are roller bearings. The outside diameters of the first and second bearings 81 and 82 are the same and the inside diameters thereof are also the same. However, as shown in FIG. 7, first and second tubular members 283 and 284 comprised of sliding bearings having the same outside diameter are provided with the sliding member 22. The inside diameter of the second tubular member 284 is smaller than a diameter of the first tubular member 283.

Fourth Embodiment

Figure 8:
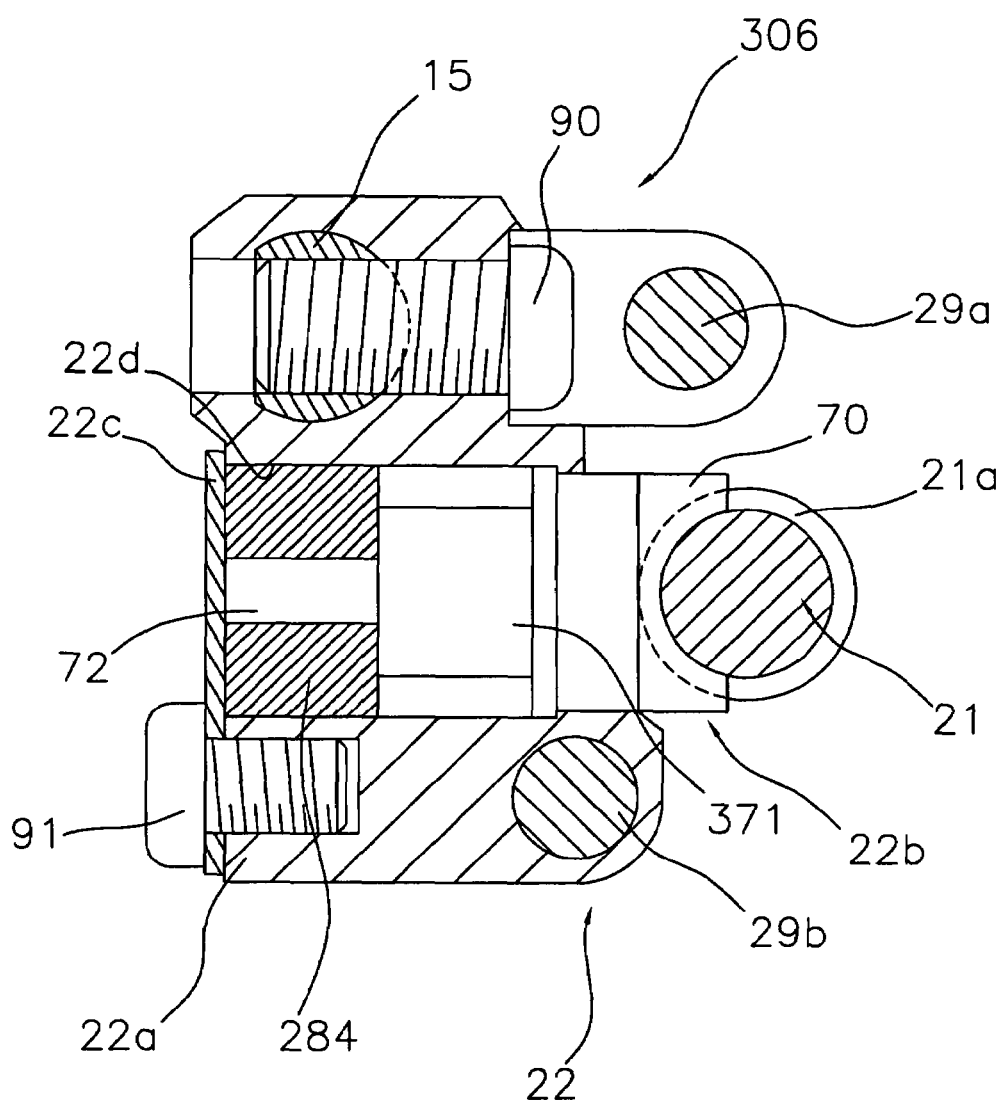
FIG. 8 is a magnified rear cross-sectional view of a portion of the spinning reel on which a reciprocating mechanism is mounted in accordance with a fourth embodiment of the present invention.

Referring now to FIG. 8, a reciprocating mechanism 306 in accordance with a fourth embodiment will now be explained. In view of the similarity between the third and fourth embodiments, the parts of the fourth embodiment that are identical to the parts of the third embodiment will be given the same reference numerals as the parts of the third embodiment. Moreover, the descriptions of the parts of the fourth embodiment that are identical to the parts of the third embodiment may be omitted for the sake of brevity.

The fourth embodiment is the same as the third embodiment except that an outer diameter of a first shaft portion 371 is larger than the outer diameter of the first shaft portion 71 of the first and third embodiment. In addition, as shown in FIG. 8, only a second tubular member 284 comprised of a sliding bearing is provided with the sliding member 22.

Fifth Embodiment

Figure 9:
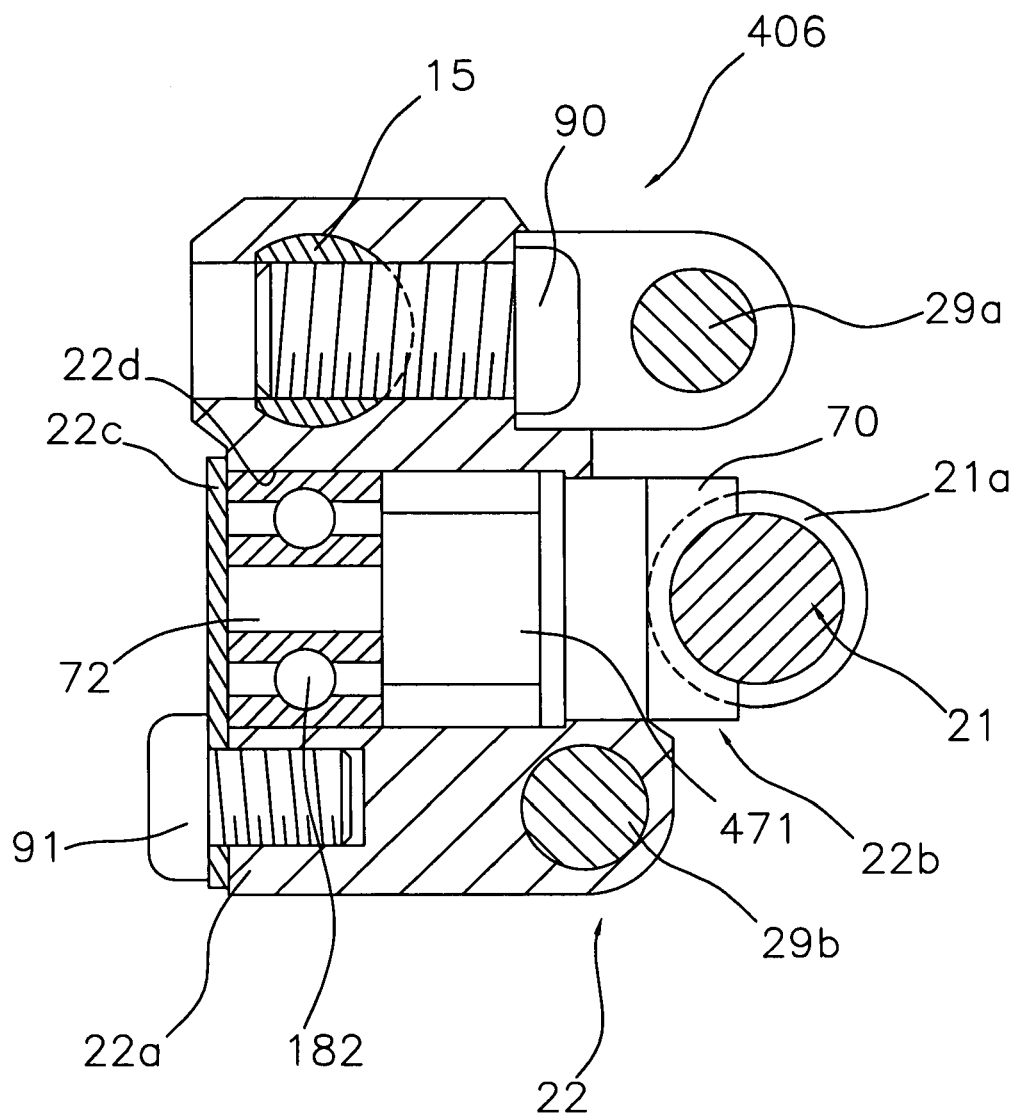
FIG. 9 is a magnified rear cross-sectional view of a portion of the spinning reel on which a reciprocating mechanism is mounted in accordance with a fifth embodiment of the present invention.

Referring now to FIG. 9, a reciprocating mechanism 406 in accordance with a fifth embodiment will now be explained. In view of the similarity between the second and fifth embodiments, the parts of the fifth embodiment that are identical to the parts of the second embodiment will be given the same reference numerals as the parts of the second embodiment. Moreover, the descriptions of the parts of the fifth embodiment that are identical to the parts of the second embodiment may be omitted for the sake of brevity.

The fifth embodiment is the same as the second embodiment except that an outer diameter of a first shaft portion 471 is larger than the outer diameter of the first shaft portion 71 of the first and second embodiment. In addition, as shown in FIG. 9, only the second bearing 182 is provided with the sliding member 22.

Sixth Embodiment

Figure 10:
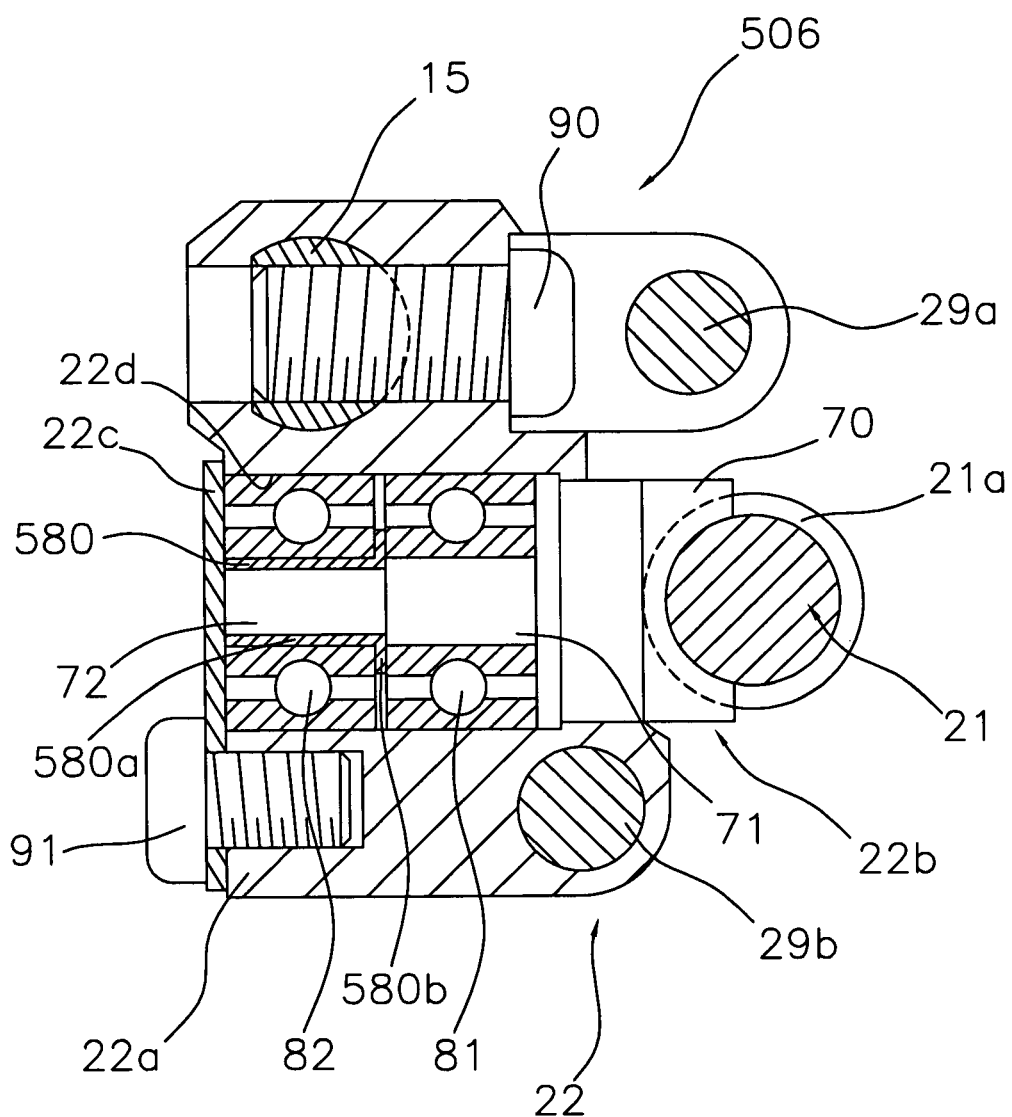
FIG. 10 is a magnified rear cross-sectional view of a portion of the spinning reel on which a reciprocating mechanism is mounted in accordance with a sixth embodiment of the present invention.

Referring now to FIG. 10, a reciprocating mechanism 506 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the first embodiment, the tubular member 80 is a member formed in a tubular shape. However, as shown in FIG. 10, a tubular member 580 of the sixth embodiment includes a tubular portion 580*a* and a brim portion 580*b*. The tubular portion 580*a* is mounted between the second shaft portion 72 and the second bearing 82. The brim portion 580*b* is integrally formed with the tubular portion 580*a*. The brim portion 580*b* has a diameter larger than that of the tubular portion 580*a*. The brim portion 580*b* contacts a surface of the first bearing 81 that faces away from the engaging portion 70 (i.e., the inner race of the first bearing 81 on the left lateral surface in FIG. 10) and a surface of the second bearing 82 that faces the engaging portion 70 (i.e., the inner race of the second bearing 82 on the right lateral surface in FIG. 10). The tubular portion 580*a* is mounted between the second shaft portion 72 and the second bearing 82. The brim portion 580*b* is interposed between the first bearing 81 and the second bearing 82. Therefore, retaining of the tubular member 580 and positioning of the second bearing 82 is easily performed.

Seventh Embodiment

Figure 11:
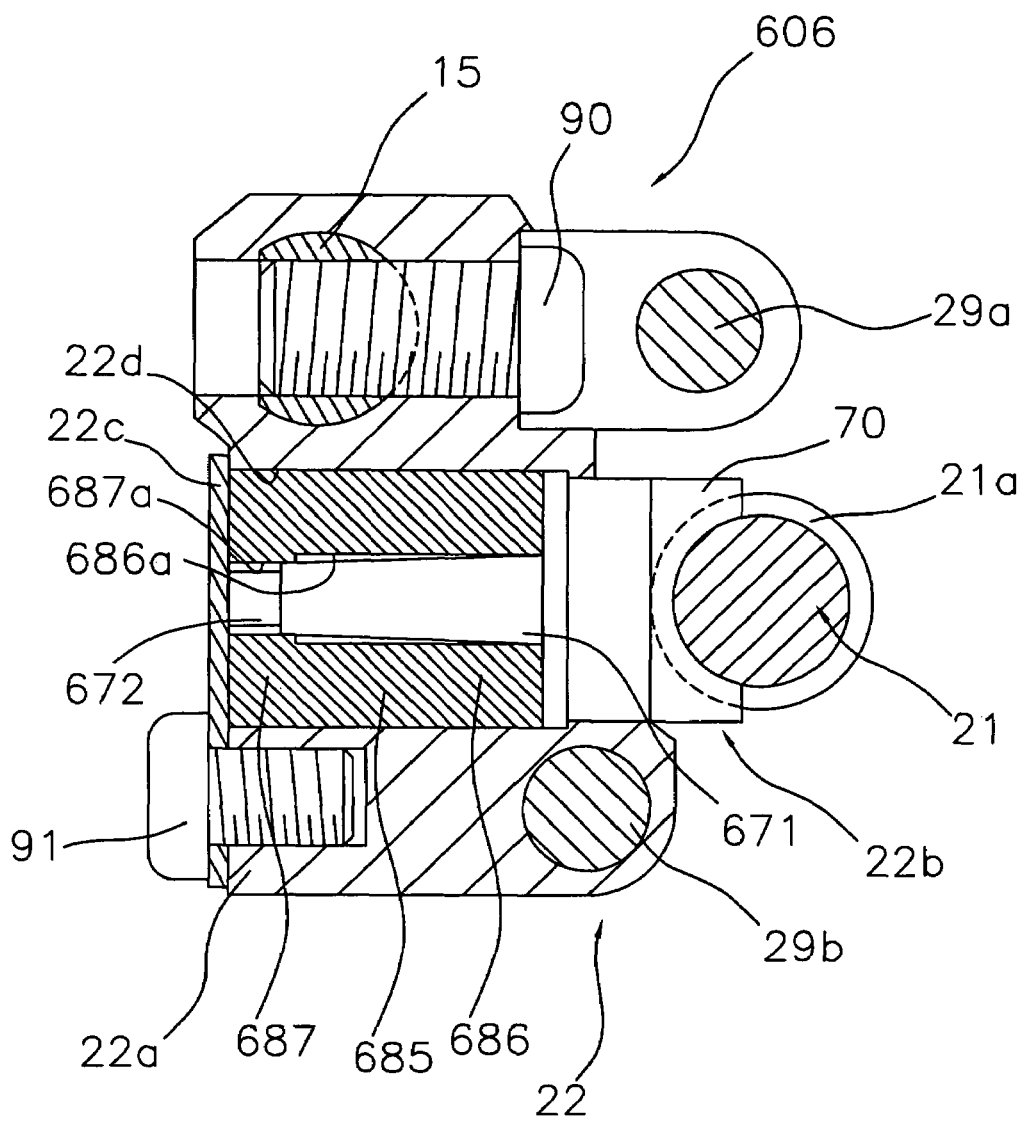
FIG. 11 is a magnified rear cross-sectional view of a portion of the spinning reel on which a reciprocating mechanism is mounted in accordance with a seventh embodiment of the present invention.

Referring now to FIG. 11, a reciprocating mechanism 606 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

As shown in FIG. 11, the reciprocating mechanism 606 includes a tubular bearing 685. An outer periphery of the tubular bearing 685 is mounted on the recess portion 22*d* and an inner periphery of the tubular bearing 685 supports the engaging member 22*b*.

As shown in FIG. 11, the engaging member 22*b* includes a first shaft portion 671 and a second shaft portion 672. The first shaft portion 671 has a tapered shape. The first shaft portion 671 is formed adjacent the engaging portion 70. The first shaft portion 671 has a diameter that is smaller than a diameter of the engaging portion 70. The second shaft portion 672 is formed on an end portion of the first shaft portion 671 remote from the engaging portion 70. The second shaft portion 672 has a diameter that is smaller than the diameter of the first shaft portion 671. The engaging portion 70, the first shaft portion 671 and the second shaft portion 672 are formed to be integrated with each other by cutting, for instance. The second shaft portion 672 has an axial length that is shorter than an axial length of the first shaft portion 671.

As shown in FIG. 11, the tubular bearing 685 is a tubular sliding bearing (i.e., bushing), and includes a first bearing portion 686 and a second bearing portion 687. The first bearing portion 686 has a first hole 686*a* that is formed at an end portion of an inner peripheral portion of the first bearing portion 686 that is adjacent the engaging portion 70 (i.e., the right side in FIG. 11). The second bearing portion 687 has a second hole 687*a* that is formed at another end of an inner peripheral portion of the second bearing portion 687 that is remote from the engaging portion 70 (i.e., the left side in FIG. 11). The second hole 687*a* is in communication with the first hole 686*a*. The second hole 687*a* has a diameter smaller than a diameter of the first hole 686*a*. The first and second bearing portions 686 and 687 are made of a synthetic resin and are integrally formed by a molding process, for example. The outside diameter of the tubular bearing 685 is formed to be approximately the same as the inside diameter of the recess portion 22*d*. The tubular bearing 685 is mounted to the recess portion 22*d* from the side remote from the engaging portion 70 (i.e., the left side in FIG. 11). The inside diameter of the first hole 686a is formed to be approximately the same as the outside diameter of a portion of the first shaft portion 671 that is adjacent the engaging portion 70 (i.e., the right side in FIG. 11). The inside diameter of the second hole 687a is formed to be approximately the same as the outside diameter of a portion of the first shaft portion 671 that is remote from the engaging portion 70 (i.e., the left side in FIG. 11). Accordingly, the portion adjacent the engaging portion 70 (i.e., the right side in FIG. 11) and the portion remote from the engaging portion 70 (i.e., the left side in FIG. 11) of the first shaft portion 671 are supported by the first hole 686a and the second hole 687a, respectively. The second shaft portion 672 does not contact the inner peripheral portion of the second hole 687a.

In this configuration, when barreling is performed for the engaging member 22b with an abrasive compound with large particles after the cutting of the engaging member 22b, the first shaft portion 671 is formed in a tapered shape so that the diameter thereof decreases away from the engaging portion 70. In this configuration, however, the diameter of the second hole 687a that is formed on the inner peripheral portion of the second bearing portion 687 is formed to be smaller than that of the first hole 686a that is formed on the inner peripheral portion of the first bearing portion 686. Therefore, the small-diameter portion of the first shaft portion 671 (i.e., the left side in FIG. 11) is supported by the small-diameter second hole 687a, and the large-diameter portion of the first shaft portion 671 (i.e., the right side in FIG. 11) is supported by the large-diameter first hole 686a. Accordingly, a gap generated between the small-diameter portion (i.e., the left side in FIG. 11) of the first shaft portion 671 and the small-diameter second hole 687a will be especially decreased. Therefore, when the first shaft portion 671 is inserted into the first and second holes 686a and 687a, a gap generated between the first shaft portion 671 and the first and second holes 686a and 687a will be decreased. Accordingly, the first shaft portion 671 is prevented from wobbling in the first and second holes 686a and 687a. In this configuration, it is possible to prevent the sliding member 22 from wobbling, and thus the back-and-forth reciprocation of the sliding member 22 is smoothly performed.

Eight Embodiment

Figure 12:
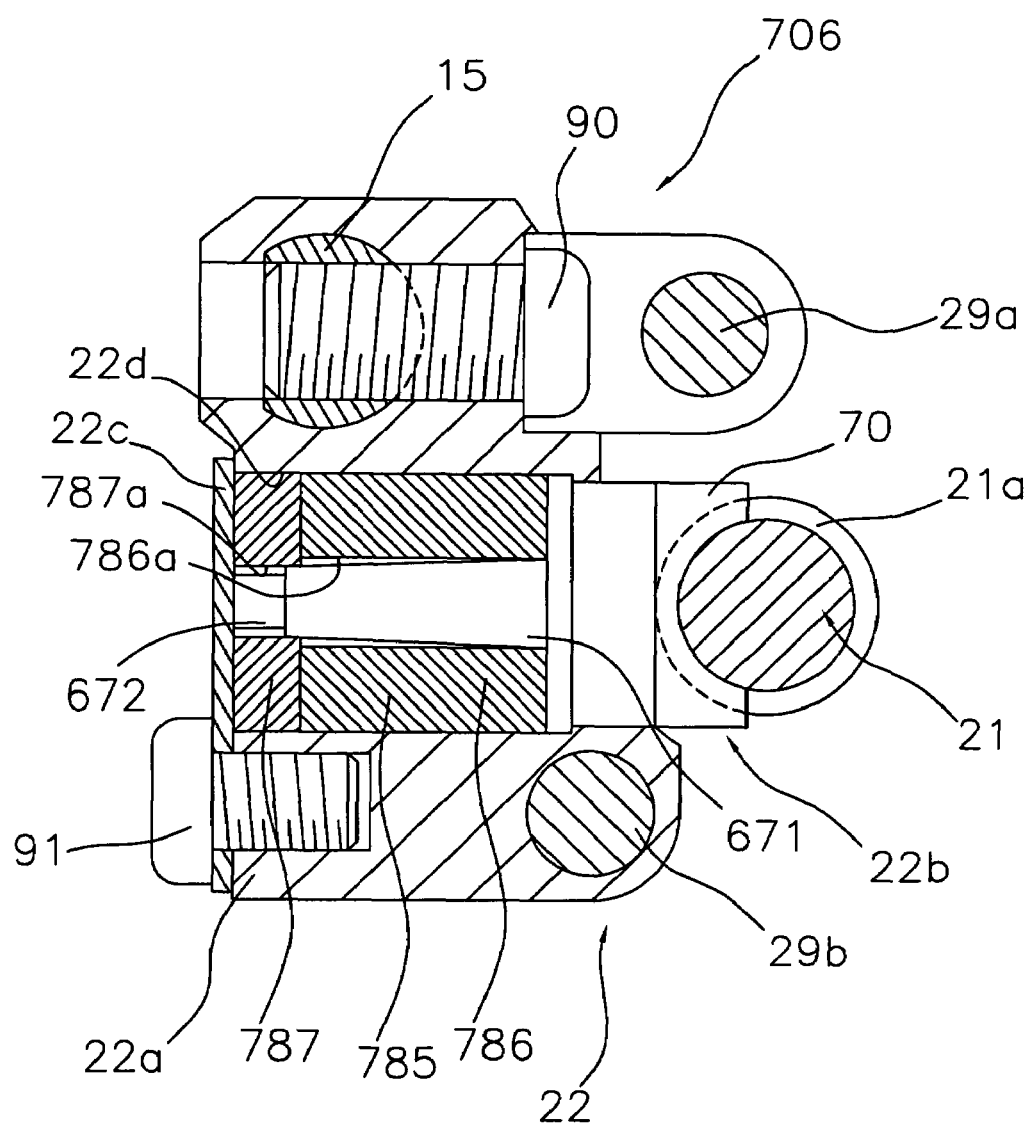
FIG. 12 is a magnified rear cross-sectional view of a portion of the spinning reel on which a reciprocating mechanism is mounted in accordance with an eighth embodiment of the present invention.

Referring now to FIG. 12, a reciprocating mechanism 706 in accordance with an eighth embodiment will now be explained. In view of the similarity between the seventh and eighth embodiments, the parts of the eighth embodiment that are identical to the parts of the seventh embodiment will be given the same reference numerals as the parts of the seventh embodiment. Moreover, the descriptions of the parts of the eighth embodiment that are identical to the parts of the seventh embodiment may be omitted for the sake of brevity.

In the seventh embodiment, the first and second bearing portions 686 and 687 of the tubular bearing 685 are integrally formed with each other. However, as shown in FIG. 12, a first bearing portion 786 including a first hole 786a and a second bearing portion 787 including a second hole 787a are formed to be separated from each other. In this configuration, the first and second holes 786a and 787a are easily formed because the first and second bearing portions 786 and 787 with diameters that are different from each other are separately provided. In addition, a diameter of the second hole 787a is formed to be smaller than that of the first hole 786a. Therefore, the first shaft portion 671 is supported by the inner peripheral portion of the second hole 787a. A gap is generated between the second hole 787a and the second shaft portion 672. Accordingly, the frictional force generated when the second hole 787a and the first shaft portion 671 contact each other is decreased.

Ninth Embodiment

Figure 13:
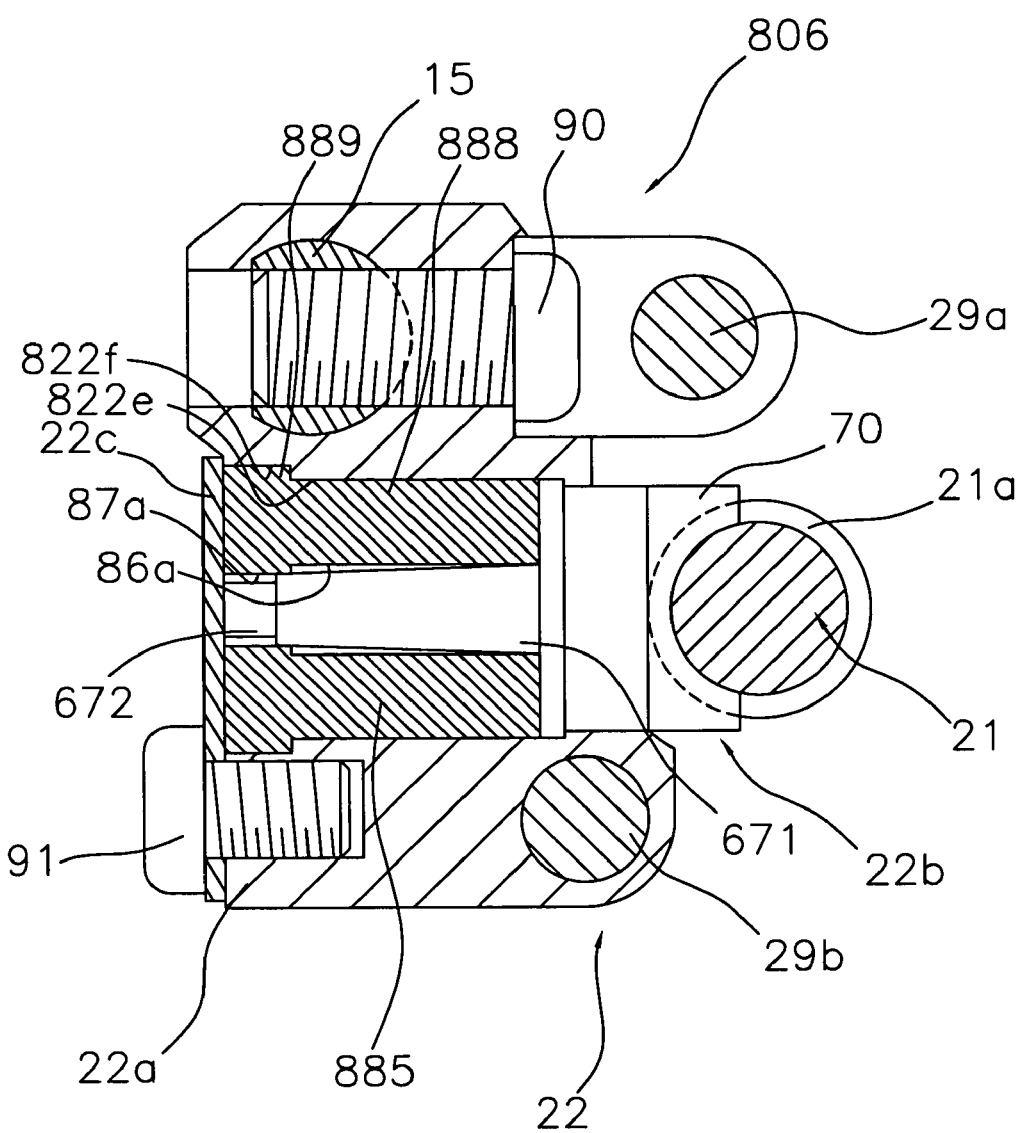
FIG. 13 is a magnified rear cross-sectional view of a portion of the spinning reel on which a reciprocating mechanism is mounted in accordance with a ninth embodiment of the present invention.

Referring now to FIG. 13, a reciprocating mechanism 806 in accordance with a ninth embodiment will now be explained. In view of the similarity between the seventh and ninth embodiments, the parts of the ninth embodiment that are identical to the parts of the seventh embodiment will be given the same reference numerals as the parts of the seventh embodiment. Moreover, the descriptions of the parts of the ninth embodiment that are identical to the parts of the seventh embodiment may be omitted for the sake of brevity.

In the seventh embodiment, the inner peripheral portion of the recess portion 22d and the outer peripheral portion of the tubular bearing 685 are formed in a tubular shape. However, as shown in FIG. 13, the recess portion 22d may include a first recess portion 822e and a second recess portion 822f. The first recess portion 822e is formed on an inner peripheral portion adjacent the engaging portion 70 (i.e., the right side inner peripheral portion in FIG. 13). The second recess portion 822f is formed on the inner peripheral portion side remote from the engaging portion 70 (i.e., the left side inner peripheral portion in FIG. 13) so as to be communicated with the first recess portion 822e. The second recess portion 822f is formed to have a diameter larger than that of the first recess portion 822e. In addition, a tubular bearing 885 includes a third bearing portion 888 that is mounted on the inner peripheral portion of the first recess portion 822e and a fourth bearing portion 889 that is mounted on the inner peripheral portion of the second recess portion 822f. The fourth bearing portion 889 is formed to have the outer peripheral portion with a diameter larger than the outside diameter of the third bearing portion 888. Here, the tubular bearing 885 is reliably secured to the first and second recess portions 822e and 822f by engaging the fourth bearing portion 889 with the second recess portion 822f having a stepped portion.

Tenth Embodiment

Figure 14:
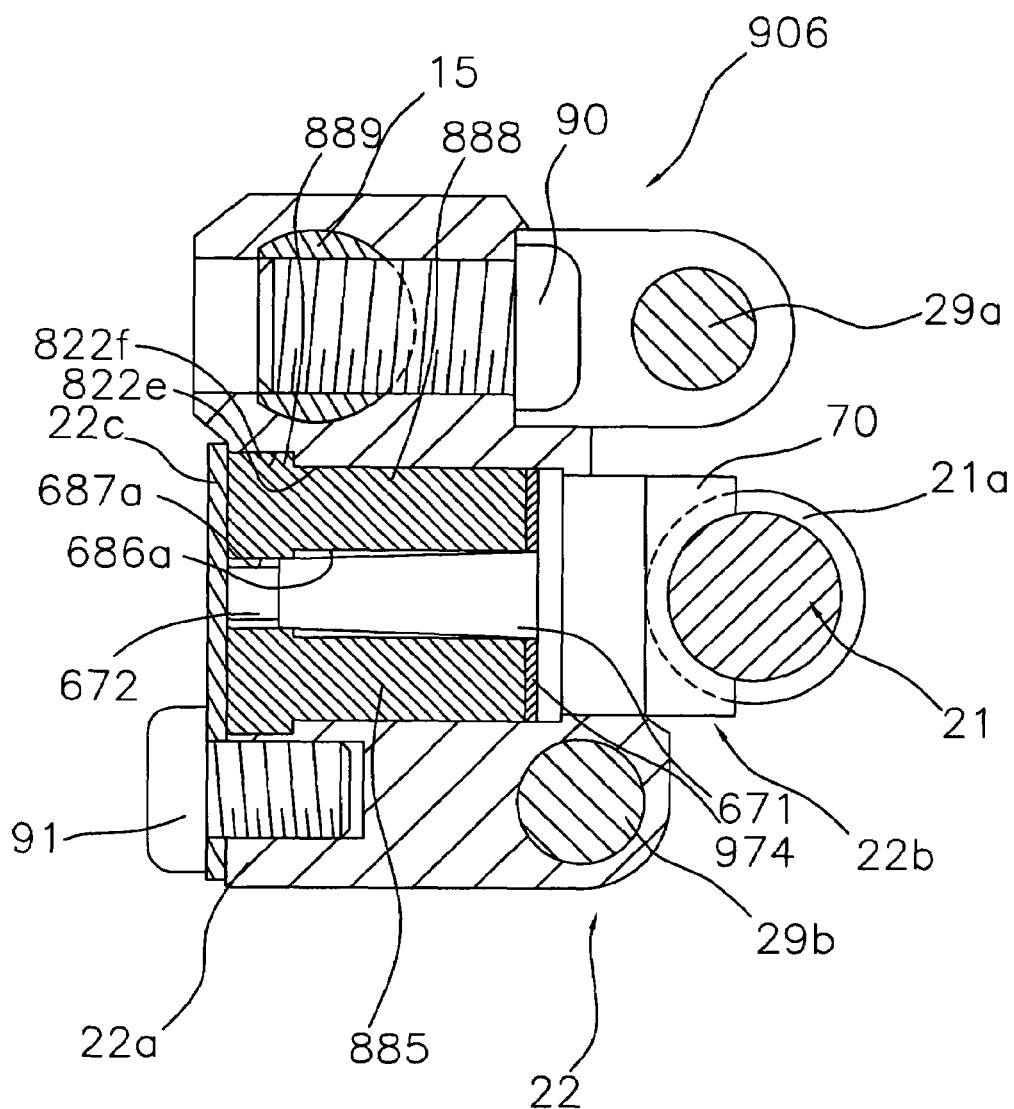
FIG. 14 is a magnified rear cross-sectional view of a portion of the spinning reel on which a reciprocating mechanism is mounted in accordance with a tenth embodiment of the present invention.

Referring now to FIG. 14, a reciprocating mechanism 906 in accordance with a tenth embodiment will now be explained. In view of the similarity between the ninth and tenth embodiments, the parts of the tenth embodiment that are identical to the parts of the ninth embodiment will be given the same reference numerals as the parts of the ninth embodiment. Moreover, the descriptions of the parts of the tenth embodiment that are identical to the parts of the ninth embodiment may be omitted for the sake of brevity.

As shown in FIG. 14, a washer 974 may be interposed between the end surface of the third bearing portion 888 (i.e., the right side surface in FIG. 14) and the end surface of the engaging portion 70 (i.e., the left side surface in FIG. 14). Here, the washer 974 can prevent the tubular bearing 885 from wobbling in the first and second recess portions 822e and 822f in the axial direction (i.e., the attachment/detachment direction). It will be apparent to one of skill in the art from this disclosure that the first and second holes 686a and 687a may be shifted back or forth in the axial direction so that they do not correspond to the first and second bearing portions 686 and 687, respectively.

Eleventh Embodiment

Figure 15:
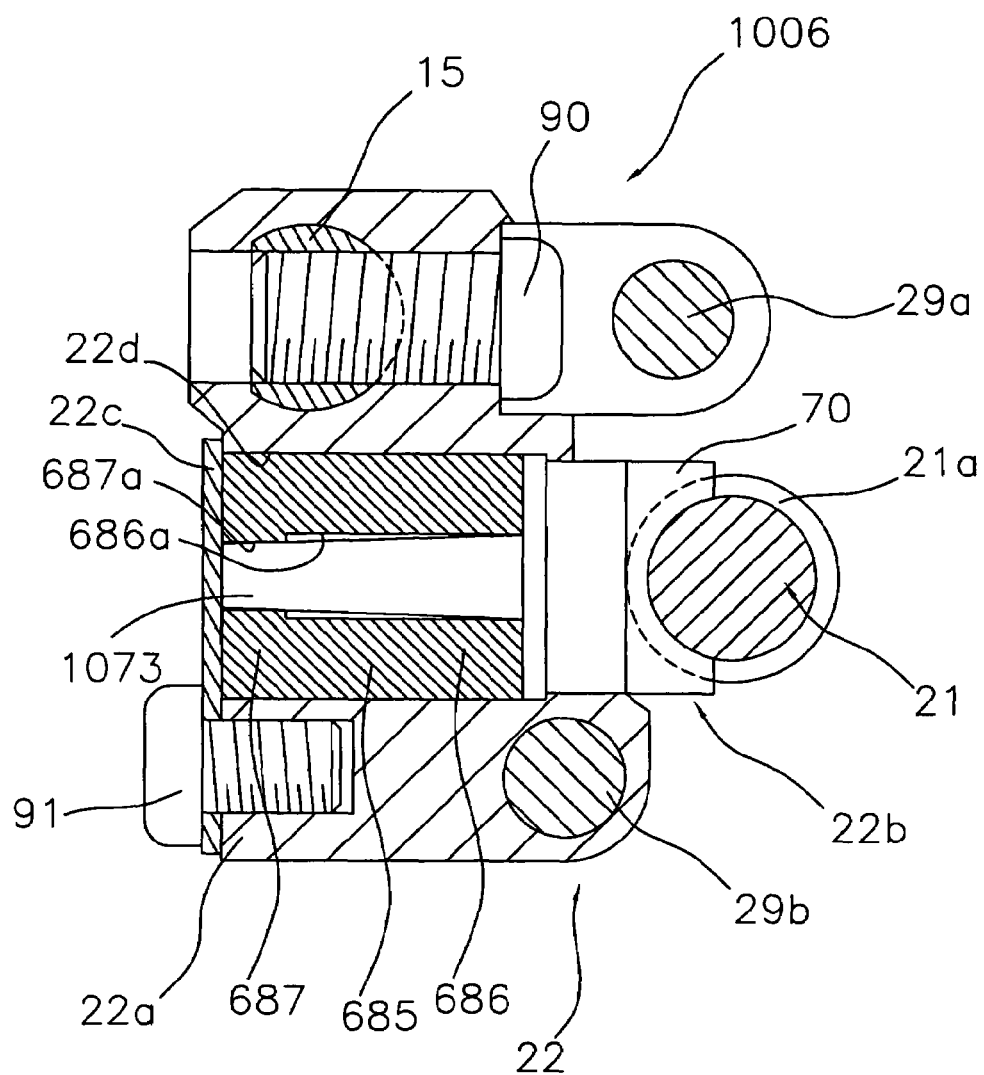
FIG. 15 is a magnified rear cross-sectional view of a portion of the spinning reel on which a reciprocating mechanism is mounted in accordance with an eleventh embodiment of the present invention.

Referring now to FIG. 15, a reciprocating mechanism 1006 in accordance with an eleventh embodiment will now be explained. In view of the similarity between the seventh and eleventh embodiments, the parts of the eleventh embodiment that are identical to the parts of the seventh embodiment will be given the same reference numerals as the parts of the seventh embodiment. Moreover, the descriptions of the parts of the eleventh embodiment that are identical to the parts of the seventh embodiment may be omitted for the sake of brevity.

Referring to FIG. 15, the reciprocating mechanism 1006 has a third shaft portion 1073 that is a single shaft portion. The third shaft portion 1073 does not include a stepped portion and is formed to have a diameter remote from the engaging portion 70 that is smaller than the diameter of the third shaft portion 1073 adjacent the engaging portion 70.

Twelfth Embodiment

Figure 16:
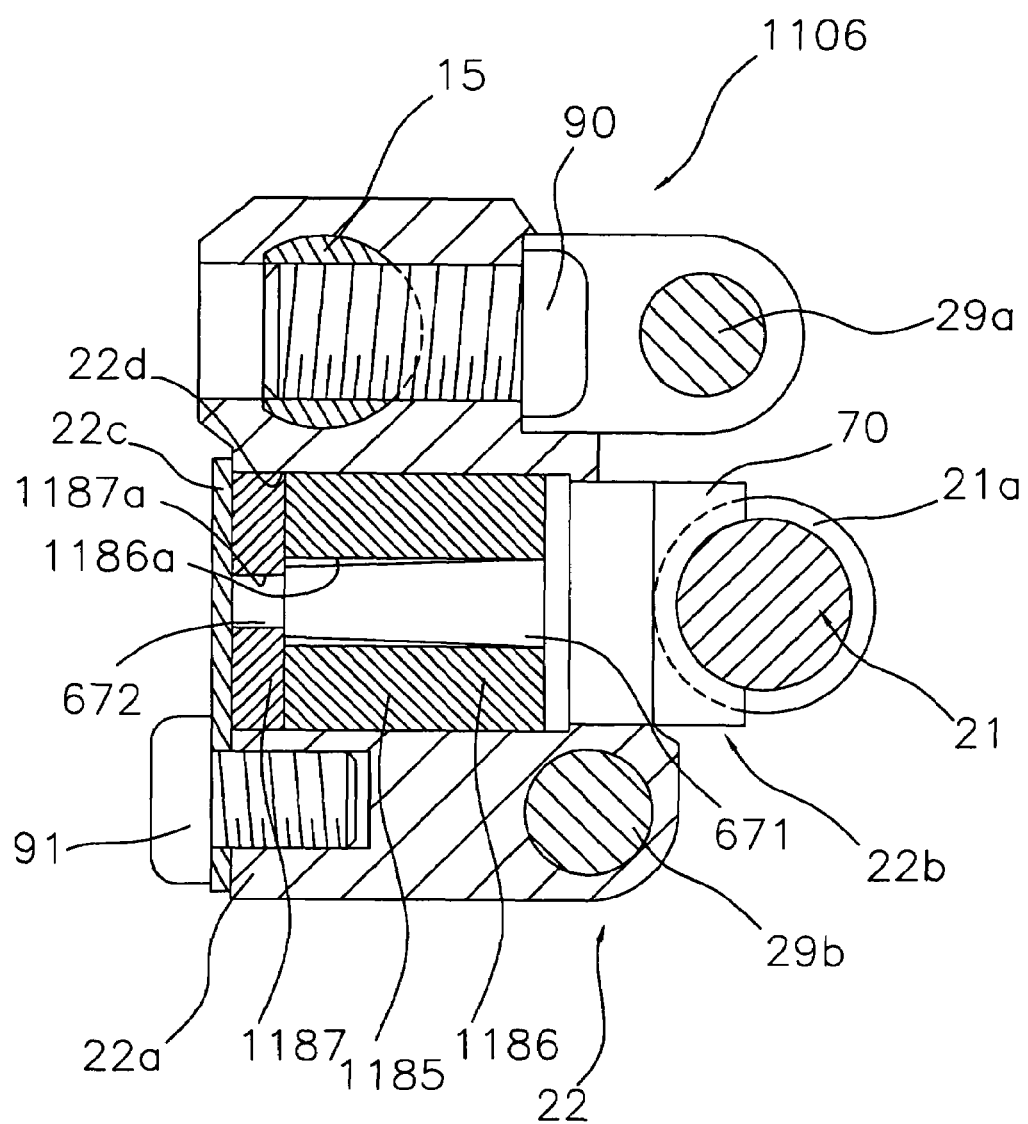
FIG. 16 is a magnified rear cross-sectional view of a portion of the spinning reel on which a reciprocating mechanism is mounted in accordance with a twelfth embodiment of the present invention.

Referring now to FIG. 16, a reciprocating mechanism 1106 in accordance with a twelfth embodiment will now be explained. In view of the similarity between the eighth and twelfth embodiments, the parts of the twelfth embodiment that are identical to the parts of the eighth embodiment will be given the same reference numerals as the parts of the eighth embodiment. Moreover, the descriptions of the parts of the twelfth embodiment that are identical to the parts of the seventh embodiment may be omitted for the sake of brevity.

Referring to FIG. 16, a portion or a whole of the second shaft portion 672 is supported by a second hole 1187a of a second bearing portion 1187. In this configuration, a first bearing portion 1186 with a first hole 1186a and the second bearing portion 1187 with the second hole 1187a are separately formed. The second shaft portion 672 is supported by the second hole 1187a of the second shaft portion 1187. Therefore, when the engaging member 22b is attached/detached to/from the body member 22a, the second shaft portion 1172 is exposed outwardly from the first bearing portion 1186 if the second bearing portion 1187 is detached from the body member 22a. Accordingly, the engaging member 22b is attached/detached to/from the body member 22a by grasping the second shaft portion 1172.

As used herein to describe the present invention, the following directional terms "forward, rearward, above, downward, vertical, horizontal, below and transverse" as well as any other similar directional terms refer to those directions of a spinning reel equipped with the present invention. Accordingly, these terms, as utilized to describe the present invention should be interpreted relative to a spinning reel equipped with the present invention as used in the normal operating position.

Terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A reciprocating mechanism of a spinning reel for reciprocating a spool secured to a spool shaft that is mounted on a reel unit of the spinning reel movably back and forth in association with rotation of a master gear, comprising:
   a worm shaft disposed along an axial direction of the spool shaft, the worm shaft having an intersecting helical groove on an outer peripheral surface thereof and rotating in association with the master gear;
   a sliding member configured to be non-movably coupled to the spool shaft in the axial direction, the sliding member including a body member with a recess portion, the recess portion having an engaging member and a longitudinal axis intersecting with the axial direction of the spool shaft, the sliding member reciprocating back-and-forth along the axial direction by rotation of the worm shaft;
   a guide portion configured to be mounted on the reel unit to guide the sliding member back-and-forth along the axial direction; and
   a rotation transmission portion configured to transmit the rotation of the master gear to the worm shaft,
   the engaging member including an engaging portion that engages with the helical groove and a shaft portion that supports the engaging member, the shaft portion being located along the longitudinal axis of the recess portion, the shaft portion having an end portion that is remote from the engaging portion and another end portion that is adjacent the engaging portion, the end portion and the another end portion of the shaft portion supporting the engaging member at the recess portion, the shaft portion having a diameter smaller than a diameter of the engaging portion, and
   the shaft portion including a first shaft portion formed at the end portion that is adjacent the engaging portion and a second shaft portion formed at the end portion that is remote from the engaging portion, the first shaft portion having a diameter smaller than a diameter of the engaging portion and the second shaft portion having a diameter smaller than the diameter of the first shaft portion.

2. The reciprocating mechanism according to claim 1, wherein
   the sliding member further includes a second bearing with an outer peripheral portion that is mounted at the recess portion and an inner peripheral portion that supports the second shaft portion.

3. The reciprocating mechanism according to claim 2, wherein
   the sliding member further includes a first bearing with an outer peripheral portion that is mounted on the recess portion and an inner peripheral portion that supports the first shaft portion.

4. The reciprocating mechanism according to claim 2, wherein
   the sliding member further includes a tubular member mounted between the second shaft portion and the second bearing.

5. The reciprocating mechanism according to claim 4, wherein
   the tubular member includes a tubular portion that is mounted between the second shaft portion and the second bearing, and a brim portion that is integrally formed with the tubular portion to have a diameter larger than a diameter of the tubular portion and mounted to a surface of the second bearing that faces the engaging portion.

6. The reciprocating mechanism according to claim 5, wherein
the brim portion is mounted on a surface of the first bearing that faces away from the engaging portion.

7. The reciprocating mechanism according to claim 1, wherein
the sliding member further includes a plate member secured to the body member to occlude an aperture of the recess portion that is remote from the engaging portion.

8. The reciprocating mechanism according to claim 7, wherein
the plate member is secured on the body member by a screw member and a head of the screw member is disposed in a position where it does not contact with the master gear when at least a portion of the body member moves to a position where the body member overlaps with the master gear in the direction of the spool shaft.

9. The reciprocating mechanism according to claim 1, wherein
the guide portion is disposed along the axial direction of the spool shaft and includes a first guide shaft and a second guide shaft that guide the sliding member in the axial direction.

10. A reciprocating mechanism comprising:
a worm shaft disposed along an axial direction of the spool shaft, the worm shaft having an intersecting helical groove on an outer peripheral surface thereof and rotating in association with the master gear;
a sliding member configured to be non-movably coupled to the spool shaft in the axial direction, the sliding member including a body member with a recess portion, the recess portion having an engaging member and a longitudinal axis intersecting with the axial direction of the spool shaft, the sliding member reciprocating back-and-forth along the axial direction by rotation of the worm shaft;
a guide portion configured to be mounted on the reel unit to guide the sliding member back-and-forth along the axial direction; and
a rotation transmission portion configured to transmit the rotation of the master gear to the worm shaft,
the engaging member including an engaging portion that engages with the helical groove and a shaft portion that supports the engaging member, the shaft portion being located along the longitudinal axis of the recess portion, the shaft portion having an end portion that is remote from the engaging portion and another end portion that is adjacent the engaging portion, the end portion and the another end portion of the shaft portion supporting the engaging member at the recess portion, the shaft portion having a diameter smaller than a diameter of the engaging portion, and the sliding member including a bushing with an outer peripheral portion that is mounted at the recess portion and an inner peripheral portion that supports the engaging member, a first hole being formed at an end portion of the inner peripheral portion of the bushing that is adjacent the engaging portion, and a second hole being in communication with the first hole and being formed at another end portion of the inner peripheral portion of the bushing that is remote from the engaging portion, the second hole having a diameter smaller than a diameter of the first hole.

11. The reciprocating mechanism according to claim 10, wherein
the bushing includes a first bearing portion, on the inner peripheral portion of which the first hole is formed, and a second bearing portion formed separately from the first bearing portion, on the inner peripheral portion of which the second hole is formed.

12. The reciprocating mechanism according to claim 10, wherein
the recess portion includes a first recess portion that is formed on the inner peripheral portion adjacent the engaging portion, and a second recess portion that is formed on the inner peripheral portion remote from the engaging portion so as to be communicated with the first recess portion and is formed to have a diameter larger than a diameter of the first recess portion, and the bearing includes a third bearing portion that is mounted on the inner peripheral portion of the first recess portion, and a fourth bearing portion that is mounted on the inner peripheral portion of the second recess portion, and the outer peripheral portion of which is formed to have a diameter larger than the outside diameter of the third bearing portion.

* * * * *